United States Patent
Khan et al.

(10) Patent No.: US 11,195,163 B2
(45) Date of Patent: Dec. 7, 2021

(54) METHODS, SYSTEMS AND COMPUTER READABLE MEDIA FOR OVER THE AIR (OTA) PROVISIONING OF SOFT CARDS ON DEVICES WITH WIRELESS COMMUNICATIONS CAPABILITIES

(75) Inventors: Mohammad Khan, San Jose, CA (US); Pradeep Kumar, Fremont, CA (US); Narendra Narayanan, Sunnyvale, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1098 days.

(21) Appl. No.: 13/453,707

(22) Filed: Apr. 23, 2012

(65) Prior Publication Data

US 2012/0254030 A1   Oct. 4, 2012

Related U.S. Application Data

(63) Continuation-in-part of application No. 12/340,568, filed on Dec. 19, 2008, now Pat. No. 8,165,635,
(Continued)

(51) Int. Cl.
*G06Q 20/32* (2012.01)
*H04L 29/06* (2006.01)
(Continued)

(52) U.S. Cl.
CPC ....... *G06Q 20/3223* (2013.01); *G06Q 20/351* (2013.01); *G06Q 20/355* (2013.01);
(Continued)

(58) Field of Classification Search
CPC ................................................ G06Q 20/3223
(Continued)

(56) References Cited

U.S. PATENT DOCUMENTS 5,578,808 A   11/1996 Taylor
5,590,038 A   12/1996 Pitroda
(Continued)

FOREIGN PATENT DOCUMENTS

AP        3452       10/2015
AU    2009282041    10/2015
(Continued)

OTHER PUBLICATIONS

White; How computers work; 7th Edition, (Year-2004) (Year: 2004).*

(Continued)

*Primary Examiner* — Mohammad A. Nilforoush
*Assistant Examiner* — Cristina Owen Sherr
(74) *Attorney, Agent, or Firm* — Jenkins, Wilson, Taylor & Hunt, P.A.

(57) ABSTRACT

A soft card provisioning application is instantiated on a device with wireless communications capabilities. A card number for a soft card desired to be provisioned on the device is obtained from a user of the device. An issuer identification number retrieved from the card number is communicated to a provisioning configuration server over an air interface. A provisioning issuer server network address is obtained from the provisioning configuration server based on the issuer identification number. Card issuer specific challenges are presented to the user, and the user's responses to the challenges are received. The challenge responses are communicated to the provisioning issuer server. Soft card image data and personalization data, where the personalization data includes personalized embossed and pre-printed data, are received from the provisioning issuer server over the air interface. The soft card is provisioned for use on the device based on the data received over the air interface.

23 Claims, 13 Drawing Sheets

Related U.S. Application Data which is a continuation-in-part of application No. 11/514,698, filed on Sep. 1, 2006, now Pat. No. 7,469,151.

(51) Int. Cl.
| | | |
|---|---|---|
| *G06Q 20/34* | (2012.01) | |
| *H04W 4/60* | (2018.01) | |
| *H04W 4/50* | (2018.01) | |
| *H04W 12/069* | (2021.01) | |
| *H04W 8/26* | (2009.01) | |
| *H04W 8/24* | (2009.01) | |
| *H04W 76/10* | (2018.01) | |

(52) U.S. Cl.
CPC ........... *H04L 63/0853* (2013.01); *H04W 4/50* (2018.02); *H04W 4/60* (2018.02); *H04W 12/069* (2021.01); *H04W 8/245* (2013.01); *H04W 8/26* (2013.01); *H04W 76/10* (2018.02)

(58) Field of Classification Search
USPC ......................................................... 705/50
See application file for complete search history.

(56) References Cited

U.S. PATENT DOCUMENTS

| | | | |
|---|---|---|---|
| 5,884,271 | A | 3/1999 | Pitroda |
| 6,078,820 | A | 6/2000 | Wells et al. |
| 6,592,044 | B1 | 7/2003 | Wong et al. |
| 6,793,135 | B1 | 9/2004 | Ryoo |
| 6,999,943 | B1 * | 2/2006 | Johnson ................. G06Q 20/10 |
| | | | 705/35 |
| 7,031,693 | B2 | 4/2006 | Öhrström et al. |
| 7,103,572 | B1 | 9/2006 | Kawaguchi et al. |
| 7,127,236 | B2 | 10/2006 | Khan et al. |
| 7,209,733 | B2 | 4/2007 | Ortiz et al. |
| 7,308,254 | B1 | 12/2007 | Rissanen |
| 7,318,049 | B2 | 1/2008 | Iannacci |
| 7,413,113 | B1 | 8/2008 | Zhu |
| 7,469,151 | B2 * | 12/2008 | Khan ..................... H04W 8/205 |
| | | | 455/558 |
| 7,631,803 | B2 | 12/2009 | Peyret et al. |
| 7,783,532 | B2 | 8/2010 | Hsu et al. |
| 7,942,337 | B2 | 5/2011 | Jain |
| 7,954,717 | B2 | 6/2011 | Narendra et al. |
| 7,962,369 | B2 | 6/2011 | Rosenberg |
| 8,155,999 | B2 | 4/2012 | de Boer et al. |
| 8,165,635 | B2 | 4/2012 | Khan et al. |
| 8,175,973 | B2 | 5/2012 | Davis et al. |
| 8,620,299 | B2 | 12/2013 | Kumar |
| 8,639,621 | B1 | 1/2014 | Ellis et al. |
| 8,751,317 | B2 | 6/2014 | Qawami et al. |
| 9,280,578 | B1 | 3/2016 | Zhou et al. |
| 9,767,452 | B2 | 9/2017 | Khan et al. |
| 10,026,076 | B2 | 7/2018 | Kumar et al. |
| 10,546,290 | B2 | 1/2020 | Khan et al. |
| 10,992,817 | B2 | 4/2021 | Kumar et al. |
| 2001/0032182 | A1 | 10/2001 | Kumar et al. |
| 2002/0026367 | A1 * | 2/2002 | Villaret ................. G06Q 20/04 |
| | | | 705/17 |
| 2002/0091569 | A1 | 7/2002 | Kitaura et al. |
| 2002/0138347 | A1 | 9/2002 | Sakata |
| 2002/0161640 | A1 | 10/2002 | Wolfe |
| 2003/0004808 | A1 | 1/2003 | Elhaoussine et al. |
| 2003/0101246 | A1 | 5/2003 | Lahti |
| 2003/0199265 | A1 | 10/2003 | Aoyama et al. |
| 2003/0236712 | A1 | 12/2003 | Antonucci et al. |
| 2004/0029569 | A1 | 2/2004 | Khan et al. |
| 2004/0054591 | A1 | 3/2004 | Spaeth et al. |
| 2004/0072592 | A1 | 4/2004 | Hasegawa |
| 2004/0131185 | A1 | 7/2004 | Kakumer |
| 2004/0181463 | A1 | 9/2004 | Goldthwaite et al. |
| 2004/0243519 | A1 | 12/2004 | Perttila et al. |
| 2005/0041793 | A1 | 2/2005 | Fulton et al. |
| 2005/0070251 | A1 | 3/2005 | Satake et al. |
| 2005/0070257 | A1 | 3/2005 | Saarinen et al. |
| 2005/0079912 | A1 | 4/2005 | Hanafusa |
| 2005/0172137 | A1 * | 8/2005 | Hopkins ............... G07F 7/1008 |
| | | | 713/185 |
| 2006/0023856 | A1 * | 2/2006 | Welton ................ H04M 17/026 |
| | | | 379/114.2 |
| 2006/0074813 | A1 * | 4/2006 | Saunders .............. G07F 7/1008 |
| | | | 705/67 |
| 2006/0080111 | A1 | 4/2006 | Homeier-Beals |
| 2006/0080232 | A1 | 4/2006 | Epps |
| 2006/0163343 | A1 | 7/2006 | Changryeol |
| 2006/0165060 | A1 * | 7/2006 | Dua ..................... G06Q 20/325 |
| | | | 370/352 |
| 2006/0180664 | A1 | 8/2006 | Barrett et al. |
| 2006/0236325 | A1 | 10/2006 | Rao et al. |
| 2006/0277104 | A1 | 12/2006 | Overhultz et al. |
| 2006/0282319 | A1 | 12/2006 | Maggio |
| 2006/0287964 | A1 | 12/2006 | Brown |
| 2007/0016479 | A1 | 1/2007 | Lauper |
| 2007/0038560 | A1 | 2/2007 | Ansley |
| 2007/0042756 | A1 | 2/2007 | Perfetto et al. |
| 2007/0050871 | A1 | 3/2007 | Mashhour |
| 2007/0087765 | A1 | 4/2007 | Richardson et al. |
| 2007/0099599 | A1 | 5/2007 | Smith et al. |
| 2007/0152829 | A1 | 7/2007 | Lindsay et al. |
| 2007/0155411 | A1 | 7/2007 | Morrison |
| 2007/0174116 | A1 | 7/2007 | Keith et al. |
| 2007/0198339 | A1 | 8/2007 | Shen et al. |
| 2007/0224979 | A1 | 9/2007 | O'Neal et al. |
| 2007/0241183 | A1 | 10/2007 | Brown et al. |
| 2007/0241189 | A1 | 10/2007 | Slavin et al. |
| 2007/0255662 | A1 | 11/2007 | Tumminaro |
| 2007/0278290 | A1 | 12/2007 | Messerges et al. |
| 2008/0000965 | A1 | 1/2008 | Zellner et al. |
| 2008/0005018 | A1 | 1/2008 | Powell |
| 2008/0040265 | A1 | 2/2008 | Rackley, III et al. |
| 2008/0040354 | A1 | 2/2008 | Ray et al. |
| 2008/0051059 | A1 | 2/2008 | Fisher |
| 2008/0052164 | A1 | 2/2008 | Abifaker |
| 2008/0097851 | A1 | 4/2008 | Bemmel et al. |
| 2008/0114884 | A1 | 5/2008 | Hewes et al. |
| 2008/0120128 | A1 | 5/2008 | Berglund et al. |
| 2008/0126145 | A1 * | 5/2008 | Rackley, III ......... G06Q 20/102 |
| | | | 455/406 |
| 2008/0147546 | A1 | 6/2008 | Weichselbaumer et al. |
| 2008/0167961 | A1 | 7/2008 | Wentker et al. |
| 2008/0192932 | A1 | 8/2008 | Graeber et al. |
| 2008/0195473 | A1 | 8/2008 | Laramy et al. |
| 2008/0201226 | A1 | 8/2008 | Carlson et al. |
| 2008/0207184 | A1 | 8/2008 | Wassingbo et al. |
| 2008/0208762 | A1 | 8/2008 | Arthur et al. |
| 2008/0238610 | A1 | 10/2008 | Rosenberg |
| 2008/0255942 | A1 | 10/2008 | Craft |
| 2008/0257958 | A1 | 10/2008 | Rothwell et al. |
| 2008/0262928 | A1 * | 10/2008 | Michaelis .......... G06Q 30/0225 |
| | | | 705/14.26 |
| 2008/0262929 | A1 | 10/2008 | Behr |
| 2009/0006254 | A1 | 1/2009 | Mumm et al. |
| 2009/0055248 | A1 | 2/2009 | Wolf |
| 2009/0150211 | A1 | 6/2009 | Bayne |
| 2009/0192912 | A1 | 7/2009 | Griffin et al. |
| 2009/0192928 | A1 | 7/2009 | Abifaker |
| 2009/0216606 | A1 | 8/2009 | Coffman et al. |
| 2009/0234745 | A1 | 9/2009 | Ramer et al. |
| 2009/0265228 | A1 | 10/2009 | Sterling et al. |
| 2009/0288012 | A1 | 11/2009 | Hertel et al. |
| 2010/0030636 | A1 | 2/2010 | Vijayshankar |
| 2010/0041368 | A1 | 2/2010 | Kumar |
| 2010/0042517 | A1 | 2/2010 | Paintin et al. |
| 2010/0063906 | A1 | 3/2010 | Nelsen et al. |
| 2010/0070364 | A1 | 3/2010 | Dugan |
| 2010/0075666 | A1 | 3/2010 | Garner |
| 2010/0082420 | A1 | 4/2010 | Trifiletti et al. |
| 2010/0088188 | A1 | 4/2010 | Kumar et al. |
| 2010/0094708 | A1 | 4/2010 | Natrajan et al. |
| 2010/0125495 | A1 | 5/2010 | Smith et al. |
| 2010/0161410 | A1 | 6/2010 | Tulloch |

(56) References Cited

U.S. PATENT DOCUMENTS

| | | |
|---|---|---|
| 2010/0174598 A1 | 7/2010 | Khan et al. |
| 2010/0213253 A1 | 8/2010 | Wollbrand et al. |
| 2010/0241494 A1 | 9/2010 | Kumar et al. |
| 2010/0312620 A1 | 12/2010 | White et al. |
| 2011/0054986 A1 | 3/2011 | Rubin et al. |
| 2011/0082746 A1 | 4/2011 | Rice et al. |
| 2011/0125565 A1 | 5/2011 | MacIlwaine et al. |
| 2011/0131107 A1 | 6/2011 | Hurst |
| 2011/0161158 A1 | 6/2011 | Lin |
| 2011/0246272 A1 | 10/2011 | Joa et al. |
| 2011/0251892 A1 | 10/2011 | Laracey |
| 2011/0264490 A1 | 10/2011 | Durvasula et al. |
| 2011/0296182 A1 | 12/2011 | Jia et al. |
| 2011/0302011 A1 | 12/2011 | Yoder et al. |
| 2012/0005026 A1 | 1/2012 | Khan et al. |
| 2012/0029997 A1 | 2/2012 | Khan et al. |
| 2012/0041823 A1 | 2/2012 | Khan |
| 2012/0078762 A1 | 3/2012 | Valin et al. |
| 2012/0185314 A1 | 7/2012 | Postrel |
| 2012/0265626 A1 | 10/2012 | Pletz et al. |
| 2012/0265685 A1 | 10/2012 | Brudnicki et al. |
| 2013/0073336 A1 | 3/2013 | Heath |
| 2013/0103484 A1 | 4/2013 | McLaughlin |
| 2013/0124349 A1 | 5/2013 | Khan et al. |
| 2013/0179495 A1 | 7/2013 | Eom et al. |
| 2013/0197987 A1 | 8/2013 | Doka et al. |
| 2013/0304651 A1 | 11/2013 | Smith |
| 2014/0180802 A1 | 6/2014 | Boal |
| 2016/0042381 A1 | 2/2016 | Braine et al. |
| 2017/0352051 A1 | 12/2017 | Watkins et al. |
| 2017/0357963 A1 | 12/2017 | Khan et al. |

FOREIGN PATENT DOCUMENTS

| | | |
|---|---|---|
| AU | 2009302485 | 10/2015 |
| CA | 2 546 911 | 11/2007 |
| CA | 2 548 911 A1 | 11/2007 |
| CA | 2 755 832 C | 10/2017 |
| CA | 2734176 | 7/2019 |
| CN | 1274897 A | 11/2000 |
| CN | 1585964 A | 2/2005 |
| CN | ZL 200780040617.4 | 11/2012 |
| CN | 102845040 B | 5/2016 |
| CN | 106056374 B | 12/2019 |
| EP | 1 528 827 A2 | 5/2005 |
| EP | 2 062 219 B1 | 7/2015 |
| EP | 2 937 829 A1 | 10/2015 |
| GB | 2387704 A | 10/2003 |
| ID | P 000 036 470 B | 7/2014 |
| IN | 330095 | 1/2020 |
| IN | 378409 | 9/2021 |
| JP | 2002-073841 | 3/2002 |
| JP | 2003271815 | 9/2003 |
| JP | 2006040249 | 2/2006 |
| JP | 2006-163466 | 8/2006 |
| JP | 2007-148593 A | 6/2007 |
| JP | 2008-186297 | 8/2008 |
| JP | 6195637 B | 8/2017 |
| KR | 10-2000-0054540 | 9/2000 |
| KR | 10-2001-0069935 | 7/2001 |
| KR | 10-2001-0097065 | 11/2001 |
| KR | 10-2002-0004566 | 1/2002 |
| KR | 10-2002-0096353 | 12/2002 |
| KR | 10-2003-0000447 | 1/2003 |
| KR | 10-2003-0013973 | 2/2003 |
| KR | 2003-0068226 | 8/2003 |
| KR | 10-2003-0080111 | 10/2003 |
| KR | 10-2004-0000712 | 1/2004 |
| KR | 10-2004-0032289 | 4/2004 |
| KR | 10-2004-0110659 | 12/2004 |
| KR | 10-2006-0022864 | 3/2006 |
| KR | 10-2006-0101240 | 9/2006 |
| KR | 10-2007-0021751 | 2/2007 |
| KR | 10-2007-0030351 | 3/2007 |
| KR | 10-2007-0051217 | 5/2007 |
| KR | 10-2008-0021436 | 3/2008 |
| KR | 10-2008-0025350 | 3/2008 |
| KR | 10-2010-0034314 A | 4/2010 |
| KR | 10-2011-0001042 A | 1/2011 |
| KR | 10-1802303 | 11/2017 |
| MX | 319439 | 4/2014 |
| MX | 336935 | 2/2016 |
| MY | 163850 A | 10/2017 |
| SG | 188926 | 9/2013 |
| SG | 170317 | 10/2013 |
| WO | WO 03/024139 A2 | 3/2003 |
| WO | WO 03/046742 A1 | 6/2003 |
| WO | WO 2004/021240 A1 | 3/2004 |
| WO | WO 2005/086593 A2 | 9/2005 |
| WO | WO 2005/098769 A1 | 10/2005 |
| WO | WO 2005/111882 A1 | 11/2005 |
| WO | WO 2006/055721 A2 | 5/2006 |
| WO | WO 2008/030307 A2 | 3/2008 |
| WO | WO 2008/042302 A2 | 4/2008 |
| WO | WO 2008/057259 A2 | 5/2008 |
| WO | WO 2008/135764 A1 | 11/2008 |
| WO | WO 2009/061139 A1 | 5/2009 |
| WO | WO 2009/069982 A2 | 6/2009 |
| WO | WO 2009/079407 A2 | 6/2009 |
| WO | WO 2009/155681 A1 | 12/2009 |
| WO | WO 2010/019670 A1 | 2/2010 |
| WO | WO 2010/042560 A2 | 4/2010 |
| WO | WO 2010/071859 A2 | 6/2010 |
| WO | WO 2011/150369 A2 | 12/2011 |
| WO | WO 2012/006090 A2 | 1/2012 |
| WO | WO 2012/024312 A2 | 2/2012 |
| WO | WO 2012/048122 A1 | 4/2012 |
| WO | WO 2013/067507 A1 | 5/2013 |
| WO | WO 2016/022929 A1 | 2/2016 |
| WO | WO 2017/209893 A1 | 12/2017 |

OTHER PUBLICATIONS

Notice of Allowance and Fee(s) Due for U.S. Appl. No. 12/190,564 (dated Jul. 10, 2013).
Result of Consultation for European Patent Application No. 07836358.7 (Jul. 5, 2013).
Communication for European publication number and information on the application of Article 67(3) EPC for European Application No. 11818673.3 (dated May 29, 2013).
Examiner's Answer for U.S. Appl. No. 12/574,696 (dated May 20, 2013).
Memo Concerning the Official Action for Mexican Patent Application No. MX/a/2011/001622 (dated Apr. 29, 2013).
Final Office Action for U.S. Appl. No. 13/170,903 (dated Apr. 5, 2013).
Communication of European publication number and information on the application of Article 67(3) EPC for European Application NO. 11804128.4 (dated Apr. 4, 2013).
Communication Pursuant to Article 94(3) EPC for European Patent Application No. 09807223.4 (dated Mar. 14, 2013).
Communication of European Publication Number and Information on the Application of Article 67(3) EPC for European Patent Application No. 11787521.1 (dated Mar. 13, 2013).
European Search Report for European Patent Application No. 09837222.0 (dated Feb. 12, 2013).
Summons to Attend Oral Proceedings for European Patent Application No. 07836358.7 (Feb. 11, 2013).
Second Office Action for for Chinese Patent Application No. 200980148141.5 (dated Jan. 31, 2013).
Final Office Action for U.S. Appl. No. 12/190,564 (dated Jan. 11, 2013).
Notice of Panel Decision from Pre-Appeal Brief Review for U.S. Appl. No. 12/574,696 (Dec. 12, 2012).
Communication pursuant to Article 94(3) EPC for European Application No. 11 787 521.1 (dated Oct. 27, 2014).
Non-Final Office Action for U.S. Appl. No. 13/118,046 (dated Sep. 25, 2014).
Non-Final Office Action for U.S. Appl. No. 13/669,346 (dated Sep. 18, 2014).

(56) References Cited

OTHER PUBLICATIONS

Non-Final Office Action for U.S. Appl. No. 13/211,082 (dated Sep. 8, 2014).
Non-Final Office Action for U.S. Appl. No. 12/651,420 (dated Sep. 3, 2014).
Notification of the Fifth Office Action for Chinese Application No. 200980148141.5 (dated Aug. 29, 2014).
Non-Final Office Action for U.S. Appl. No. 16/170,903 (dated Aug. 22, 2014).
Communication of European publication number and information on the application of Article 37(3) EPC for European Application No. 12846583.8 (dated Aug. 13, 2014).
Examination Report for African Application No. AP/P/2011/005662 (dated Aug. 7, 2014).
Notification of the First Office Action for Chinese Application No. 200980157050.8 (dated Aug. 4, 2014).
Examination Report for ARIPO Patent Application No. AP/P/2011/005619 (dated Jul. 30, 2014).
Notification of Grant for Indonesia Patent Application No. W00 2011 01632 (dated Jul. 25, 2014).
Extended European Search Report for European Application No. 11804128.4 (dated Jul. 21, 2014).
Communication under Rule 71(3) EPC for European Patent Application No. 07836358.7 (dated Jul. 2, 2014).
Examination Report for Australian Patent Application No. 2009282041 (dated Jun. 12, 2014).
Office Action for Japanese Patent Application No. 2011-531127 (dated Jun. 9, 2014).
Notification of the Fourth Office Action for Chinese Application No. 200980148141.5 (dated Jun. 4, 2014).
Patent Examination Report No. 1 for Australian Patent Application No. 2009302485 (dated May 28, 2014).
Verbal Communication for Indonesia Patent Application No. W00 2011 01632 (dated May 23, 2014).
Official Action for Mexican Patent Application No. MX/a/2011/003425 (dated May 16, 2014).
Communication pursuant to Article 94(3) EPC for European Application No. 09 837 222.0 (dated Apr. 23, 2014).
Non-Final Office Action for U.S. Appl. No. 13/118,046 (dated Apr. 16, 2014).
Notification of the Third Office Action for Chinese Application No. 200980140368.5 (dated Apr. 8, 2014).
Office Action for Indian Application No. 1752/CHENP/2009 (dated Mar. 27, 2014).
Decision to Refuse for European Application No. 09 807 223.4 (dated Mar. 18, 2014).
Extended European Search Report for European Application No. 11787521.1 (dated Feb. 28, 2014).
Notics of Allowance for Mexican Patent Application No. MX/a/2011/001622 (dated Feb. 20, 2014).
Extended European Search Report for European Application No. 11818673.3 (dated Jan. 31, 2014).
Non-Final Office Action for U.S. Appl. No. 13/211,082 (dated Dec. 30, 2013).
Extended European Search Report for European Application No. 09833865.0 (dated Dec. 12, 2013).
Result of Consultation for European Application No. 09 807 223.4 (Dec. 6, 2013).
Third Office Action for Chinese Application No. 200960148141.5 (dated Nov. 7, 2013).
Communication pursuant to Article 94(3) EPC for European Application No. 09 837 222.0 (dated Oct. 21, 2013).
Third Office Action for Mexican Patent Application No. MX/a/2011/001622 (dated Oct. 11, 2013).
Final Office Action for U.S. Appl. No. 13/118,046 (dated Oct. 2, 2013).
Summons to attend oral proceedings pursuant to Rule 115(1) EPC for European Application No. 09807223.4 (Sep. 25, 2013).
Notification of Transmittal of the International Search Report and the Written Opinion of the International Searching Authority, or the Declaration for International Application No. PCT/US2013/037803 (dated Aug. 21, 2013).
Final Office Action for U.S. Appl. No. 12/651,420 (dated Aug. 2, 2013).
Result of consultation for European Application No. 07 836 358.7 (Jul. 18, 2013).
Second Office Action for Chinese Patent Application No. 200980140368.5 (dated Jun. 4, 2013).
Notification of Transmittal of the International Search Report and the Written Opinion of the International Searching Authority, or the Declaration for the International Patent Application No. PCT/US2012/063568 (dated Mar. 26, 2013).
Data Management, EMV Integrated Circuit Card Specifications for Payment Systems, Book 4: Cardholder, Attendant, and Acquirer Interface Requirements, Version 4.2, pp. 81-94 (Jun. 2008).
"Identification cards—Integrated circuit cards—Part 4: Organization, security and commands for interchange," ISO/IEC 7816-4, Second Edition, pp. 1-90 (Jan. 15, 2005).
"Information technology—Identification cards—Integrated circuit(s) cards with contacts—Part 5: Registration of application providers," ISO/IEC 7816-5.2, pp. 1-12 (Jan. 17, 2003).
"Information technology—Identification cards—integrated circuit(s) cards with contacts—Part 4: interindustry commands for interchange," ISO/IEC 7816-4, pp. 1-85 (Jan. 17, 2003).
"Identification cards—Integrated circuit(s) cards with contacts—Part 5: Numbering system and registration procedure for application identifiers," ISO/IEC 7816-5, Amendment 1, pp. 1-18 (Dec. 15, 1996).
"Identification cards—Integrated circuit(s) cards with contacts—Part 5: Numbering system and registration procedure for application identifiers." ISO/IEC 7816-5, First Edition, pp. 1-12 (Jun. 15, 1994).
Verbal Communication for Indonesia Patent Application No. W00 2011 01632 (dated Mar. 17, 2014).
Non-Final Official Action for U.S. Appl. No. 13/170,903 (dated Oct. 23, 2012).
Memo Concerning the Official Action for Mexican Patent Application No. MX/a/2011/001622 (dated Oct. 16, 2012).
Non-Final Official Action for U.S. Appl. No. 13/118,046 (dated Oct. 3, 2012).
Non-Final Official Action for U.S. Appl. No. 12/651,420 (dated Sep. 12, 2012).
Final Official Action for U.S. Appl. No. 12/406,916 (dated Sep. 4, 2012).
European Search Report for European Application No. 10754103.9 (dated Aug. 20, 2012).
Final Official Action for U.S. Appl. No. 12/574,696 (dated Aug. 7, 2012).
Chinese Patent Application No. 200780040617.4 for Notice of Granting Patent Right for Invention (dated Aug. 3, 2012).
Extended European Search Report for European Application No. 09819787.4 (dated Aug. 1, 2012).
First Office Action for Chinese Patent Application No. 200980140368.5 (dated Jul. 30, 2012).
Communication pursuant to Article 94(3) EPC for European Application No. 07 836 358.7 (dated Jul. 4, 2012).
Applicant-Initiated Interview Summary for U.S. Appl. No. 12/574,696 (Jun. 26, 2012).
Non-Final Official Action for U.S. Appl. No. 12/190,564 (dated Jun. 4, 2012).
Extended European Search Report for European Application No. 09807223.4 (dated Jun. 1, 2012).
First Office Action for Chinese Patent Application No. 200980148141.5 (dated Apr. 23, 2012).
Notification of Transmittal of the International Search Report and the Written Opinion of the International Searching Authority, or the Declaration for International Application No. PCT/US2011/047945 (dated Mar. 28, 2012).
Notification of Transmittal of the International Search Report and the Written Opinion of the International Searching Authority, or the Declaration for the International Application No. PCT/US2011/038408 (dated Feb. 29, 2012).

(56) References Cited

OTHER PUBLICATIONS

Non-Final Official Action for U.S. Appl. No. 12/574,696 (dated Feb. 28, 2012).
Supplemental Notice of Allowance for U.S. Appl. No. 12/340,568 (dated Feb. 6, 2012).
Second Office Action for Chinese Patent Application No. 200780040617.4 (dated Jan. 18, 2012).
Notification of Transmittal of the International Search Report and the Written Opinion of the International Searching Authority, or the Declaration for International Application No. PCT/US2009/068875 (dated Jan. 18, 2012).
Communication of European publication number and information on the application of Article 67(3) EPC for Application No. 10754103.9 (dated Dec. 29, 2011).
Notification of Transmittal of the International Search Report and the Written Opinion of the International Searching Authority, or the Declaration for the International Application No. PCT/US2011/042186 (dated Dec. 28, 2011).
Notice of Allowance and Fee(s) Due for U.S. Appl. No. 12/340,568 (dated Dec. 15, 2011)
Declaration of Mohammad Khan for U.S. Appl. No. 12/340,568 (dated Dec. 15, 2011).
C-SAM's Anser to Defendant's Counterclaims in the United States District Court for the District of Delaware for Civil Action No. C.A. 11-881-GMS (Dec. 15, 2011).
Communication of European publication number and information on the application of Article 67(3) EPC for European Application No. 09833865.0 (dated Dec. 7, 2011).
Vivotech, Inc.'s Answer, Defenses and Counterclaims in the United States District Court for the District of Delaware for Civil Action No. C.A. No. 11-881-GMS (Nov. 21, 2011).
Final Office Action for U.S. Appl. No. 12/190,564 (dated Oct. 28, 2011).
Non-Final Official Action for U.S. Appl. No. 12/406,916 (dated Oct. 5, 2011).
Communication of European publication number and information on the application of Article 67(3) EPC for European Application No. 09837222.0 (dated Sep. 28, 2011).
Applicant-Initiated Interview Summary for U.S. Appl. No. 12/574,696 (dated Sep. 26, 2011).
Extended European Search Report for European Application No. 07836358.7 (dated Sep. 22, 2011).
Non-Final Official Action for U.S. Appl. No. 12/340,568 (dated Aug. 8, 2011).
Communication of European publication number and information on the application of Article 67(3) EPC for European Application No. 09819787.4 (dated Jul. 6, 2011).
Final Official Action for U.S. Appl. No. 12/574,696 (dated Jun. 8, 2011).
Non-Final Official Action for U.S. Appl. No. 12/190,564 (dated May 24, 2011).
Notification Concerning Transmittal of International Preliminary Report on the Patentability for International Application No. PCT/US2009/059752 (dated Apr. 21, 2011).
First Office Action for Chinese Patent Application No. 200780040617.4 (dated Apr. 8, 2011).
Official Action for U.S. Appl. No. 12/574,696 (dated Feb. 16, 2011).
Notification of Transmittal of the International Search Report and the Written Opinion of the International Searching Authority, or the Declaration for International Application No. PCT/US2010/027801 (dated Oct. 21, 2010).
Notification of Transmittal of the International Search Report and the Written Opinion of the International Searching Authority, or the Declaration for the International Application No. PCT/US2009/069970 (dated Jul. 30, 2010).
Notification of Transmittal of the International Search Report and the Written Opinion of the International Searching Authority, or the Declaration for the International Application No. PCT/US2009/059752 (dated May 20, 2010).
Interview Summary for U.S. Appl. No. 12/184,847 (dated May 5, 2010).
Notification of Transmittal of the International Search Report and the Written Opinion of the International Searching Authority, or the Declaration for International Application No. PCT/US2009/053556 (dated Apr. 5, 2010).
Notification of Transmittal of the International Search Report and the Written Opinion of the International Searching Authority, or the Declaration for International Application No. PCT/US2009/052618 (dated Mar. 30, 2010).
Official Action for U.S. Appl. No. 12/184,847 (dated Jan. 6, 2010).
Communication of European Publication Number and Information on the Application of Article 67(3) EPC for European application No. 07836358.7 (dated Apr. 29, 2009).
Notice of Allowability for U.S. Appl. No. 11/514,698 (dated Nov. 17, 2008).
Notice of Allowance and Fee(s) Due for U.S. Appl. No. 11/514,698 (dated Aug. 28, 2008).
Notification for Transmittal of the International Search Report and the Written Opinion of the International Searching Authority, or the Declaration for the International Application No. PCT/US07/17091 (dated Jun. 26, 2008).
"Idea: OnlineSecure Electronic Prepaid Virtual Debit Card," http://www.ideablob.com, 3 pages (Copyright 2007-2009).
"Notice from the European Patent Office dated Oct. 1, 2007 concerning business methods," Official Journal EPO, pp. 592-593 (dated Nov. 2007).
"ViVOnfc Suite," ViVOtech Products, http://www.vivotech.com/products/vivo_nfc/ index.asp, pp. 1-2 (Dec. 31, 2006).
"Giesecke & Devrient provides over the air personalization for handsets with PayPass," NFCNews. pp. 1-2 (Apr. 13, 2006).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
"Mobile Money Transfer Fact Sheet," Western Union, http://corporate.westernunion.com/news_media_MobileMoney.html, 1 page (Copyright 2001-2009).
"EMO™—Electronic Money Orders—How EMO Works," https://www.emocorp.com, 1 page (Copyright 1999-2009).
"EMO™—Electronic Money Orders—Options for Moving Your Money with EMO," https://www.emocorp.com, 1 page (Copyright 1999-2009).
"Mobile Payments with PayPal—Send Money from Your Mobile Phone," https://www.paypal.com, 1 page, (Copyright 1999-2009).
"PayPal Mobile FAQ," https://www.paypal.com, 2 pages (Copyright 1999-2009).
"Texting with PayPal—Easy as Lifting a Finger," https://www.paypal.com, 1 page (Copyright 1999-2009).
Advisory Action Before the Filing of an Appeal Brief for U.S. Appl. No. 12/651,420 (dated Aug. 17, 2015).
Advisory Action Before the Filing of an Appeal Brief, Examiner-Initiated Interview Summary, and AFCP 2.0 Decision for U.S. Appl. No. 13/211,082 (dated Jul. 20, 2015).
Communication pursuant to Article 94(3) EPC for European Application No. 11 787 621.1 (dated Jul. 16, 2015)
Non-Final Office Action for U.S. Appl. No. 13/669,345 (dated Jul. 15, 2015).
Notice of Acceptance for Australian Application No. 2009282041 (dated Jul. 29, 2015).
Non-Final Office Action for U.S. Appl. No. 12/406,916 (dated Jun. 19, 2015).
Decision to grant a European patent pursuant to Article 97(1) EPC for European Application No. 07836358.7 (dated Jun. 18, 2015).

(56) References Cited

OTHER PUBLICATIONS

Advisory Action, Applicant-Initiated Interview Summary, & AFCP 2.0 Decision for U.S. Appl. No. 13/689,345 (dated Jun. 15, 2015).
Notice of Acceptance of Australian Application No. 2009302485 (dated Jun. 2, 2015).
Extended European Search Report for European Patent Application No. 12646583.6 (dated May 19, 2015).
Final Office Action for U.S. Appl. No. 13/211,082 (dated May 7, 2015).
Final Office Action for U.S. Appl. No. 12/651,420 (dated May 4, 2015).
Notification of Decision to Grant or Register for ARIPO Application No. AP/P/2011/005619 (dated Apr. 28, 2015).
Second Office Action for Chinese Patent Application No. 200980157050.8 (dated Apr. 1, 2015).
Decision of Rejection for Chinese Application No. 200980148141.5 (dated Mar. 4, 2015).
Communication pursuant to Article 94(3) EPC for European Application No. 09 819 787.4 (dated Feb. 19, 2015).
Substantive Examination Report for Malaysian Application No. PI 2011001548 (dated Feb. 13, 2015).
Office Action for Japanese Patent Application No. 2011-531127 (dated Feb. 9, 2015).
Decision of Rejection for Chinese Application No. 200980140368.5 (dated Jan. 7, 2015).
Final Office Action for U.S. Appl. No. 13/118,046 (dated Feb. 27, 2015).
Communication of European publication number and information on the application of Article 67(3) EPC for European Application No. 13780892.9 (dated Feb. 4, 2015).
Final Office Action for U.S. Appl. No. 13/669,346 (dated Feb. 20, 2015).
Appicant-Initiated Interview Summary for U.S. Appl. No. 12/651,420 (dated Feb. 26, 2015).
Applicant-Initiated Interview Summary for U.S. Appl. No. 13/211,082 (dated Jan. 26, 2015).
Applicant-Initiated Interview Summary for U.S. Appl. No. 13/118,046 (dated Jan. 23, 2015).
Office Action for Mexican Patent Application No. 2011003425 (dated Dec. 10, 2014).
Communication under Rule 71(3) EPC for European Patenent Application No. 07836358.7 (dated Dec. 17, 2014).
Final Office Action for U.S. Appl. No. 13/170,903 (dated Dec. 9, 2014).
Advisory Action for U.S. Appl. No. 13/170,903 (dated Aug. 22, 2016).
Non-Final Office Action for U.S. Appl. No. 12/574,696 (dated Aug. 16, 2016).
Non-Final Office Action for U.S. Appl. No. 13/669,346 (dated Jul. 25, 2016).
Patent Examination Report No. 1 for Australian Patent Application No. 2015218423 (dated Jul. 14, 2016).
Communication pursuant to Article 94(3) EPC for European Application No. 10 754 103.9 (dated Jul. 14, 2016).
Communication pursuant to Article 94(3) EPC for European Patent Application No. 11 818 673.3 (dated Jul. 13, 2016).
Final Office Action for U.S. Appl. No. 12/406,916 (dated Jul. 1, 2016).
Examiner's Answer for U.S. Appl. No. 12/651,420 (dated Jul. 1, 2016).
Summons to attend oral proceedings pursuant to Rule 115(1) EPC for European Patent Application No. 11787521.1 (Jun. 29, 2016).
Summons to attend oral proceedings pursuant to Rule 115(1) EPC for European Patent Application No. 11804128.4 (Jun. 27, 2016).
Non-Final Office Action for U.S. Appl. No. 13/211,082 (dated Jun. 17, 2016).
Office Action for Malaysian Patent Application Serial No. PI 2011001548 (dated Jun. 15, 2016).
Commonly-assigned, co-pending U.S. Appl. No. 15/172,123 for "Methods, Systems, and Computer Readable Media for Providing a Personalized Offers Integration Platform," (Unpublished, filed Jun. 2, 2016).
Final Office Action for U.S. Appl. No. 13/170,903 (dated Jun. 2, 2016).
Decision of Reexamination for Chinese Application No. 200980140368.5 (dated May 30, 2016).
Decision to Refuse a Patent (Final Rejection) for Korean Patent Application No. 10-2011-7009841 (dated May 13, 2016).
Latif et al., "Automated notification and document downloading in E-learning—development of an agent-based framework utilizaing the push-pull technology interaction policy", Information Technology, 2008. ITSIM 2008. International Symposium On, IEEE, Piscataway, NJ, USA 26, p. 1-7 (Aug. 26, 2008).
Non-Final Office Action for U.S. Appl. No. 13/118,046 (dated Jun. 20, 2017).
Summons to attend oral proceedings pursuant to Rule 115(1) EPC for European Application No. 09837222.0 (May 31, 2017).
Final Office Action for U.S. Appl. No. 14/455,453 (dated May 31, 2017).
Letter Regarding Notice of Decision to Refuse a Patent for Korean Application No. 10-2016-7026352 (dated May 18, 2017).
Notice of Allowance and Fee(s) due for U.S. Appl. No. 13/669,346 (dated May 4, 2017).
Final Office Action for U.S. Appl. No. 12/574,696 (dated May 2, 2017).
Notice of Panel Decision from Pre-Appeal Brief Review for U.S. Appl. No. 12/574,696 (dated Apr. 26, 2017).
Advisory Action for U.S. Appl. No. 13/211,082 (dated Apr. 19, 2017).
Non-Final Office Action for U.S. Appl. No. 12/406,916 (dated Apr. 10, 2017).
First Office Action for Japanese Patent Application No. 2016-031210 (dated Mar. 27, 2017).
Communication pursuant to Article 94(3) EPC for European Application No. 15 165 149.4 dated (Mar. 22, 2017).
Applicant-Initiated Interview Summary for U.S. Appl. No. 14/455,453 (dated Mar. 20, 2017).
Decision to refuse a European Patent application for European Application No. 11 804 128.4 (dated Mar. 8, 2017).
Examiner's Answer to Appeal Brief for U.S. Appl. No. 13/170,903 (dated Mar. 1, 2017).
Notice of Allowance for Canadian Patent Application No. 2,755,832 (dated Feb. 27, 2017).
Letter regarding Decision to Grant for Japanese Patent Application No. 2016-031210 (dated Jul. 18, 2017).
Patent Examination Report No. 3 for Australian Patent Application No. 2015218423 (dated Jul. 12, 2017).
Notification of Transmittal of the International Search Report and the Written Opinion of the International Searching Authority, or the Declaration for International Application No. PCT/US2017/031220 (dated Jun. 29, 2017).
Result of consultation for European Application No. 11 804 128.4 (dated Feb. 9, 2017).
Terry, "Restaurants aim to boost sales with mobile apps," Nations's Restaurants News, pp. 1-6 (Mar. 2, 2009).
Advisory Action for U.S. Appl. No. 13/118,046 (dated Jan. 4, 2018).
Office Action for Canadian Patent Application No. 2,734,176 (dated Nov. 29, 2017).
Final Office Action for U.S. Appl. No. 12/406,916 (dated Oct. 24, 2017).
Non-Final Office Action for U.S. Appl. No. 14/455,453 (dated Oct. 24, 2017).
Final Office Action for U.S. Appl. No. 13/118,046 (dated Oct. 24, 2017).
Examiner's Answer for U.S. Appl. No. 13/211,082 (dated Oct. 20, 2017).
Decision to refuse a European Patent application for European Patent Application No. 12 846 583.8 (dated Sep. 26, 2017).
Result of consultation for European Patent Application No. 12 846 583.8 (dated Sep. 22, 2017).

(56) References Cited

OTHER PUBLICATIONS

Communication pursuant to Article 94(3) EPC for European Patent Application No. 13 780 892.9 (dated Aug. 31, 2017).
Letter Regarding Decision to Grant for Korean Patent Application No. 10-2016-7026352 (dated Aug. 25, 2017).
Decision on Appeal for U.S. Appl. No. 12/651,420 (Aug. 25, 2017).
Advisory Action and AFCP 2.0 Decision for U.S. Appl. No. 12/574,696 (dated Aug. 24, 2017).
Letter regarding Issuance of Certificate of Grant for Malaysian Patent Application No. PL 2011001548 (dated Aug. 15, 2017).
Advisory Action for U.S. Appl. No. 14/455,453 (dated Aug. 11, 2017).
Result of consultation for European Patent Application No. 12 846 583.8 (Aug. 4, 2017).
Communication pursuant to Article 94(3) EPC for European Patent Application No. 11 818 673.3 (dated Jul. 31, 2017).
Brief Communication for European Patent Application No. 09837222.0 (dated Jan. 16, 2018).
Advisory Action for U.S. Appl. No. 12/406,916 (dated Jan. 10, 2018).
Advisory Action for U.S. Appl. No. 13/669,346 (dated Feb. 10, 2017).
Result of consultation for U.S. Patent Application Serial No. 11 804 128.4 (Feb. 9, 2017).
Final Office Action for U.S. Appl. No. 12/574,696 (dated Feb. 2, 2017).
Canadian Office Action for Canadian Application No. 2,734,176 (dated Dec. 21, 2016).
Final Office Action for U.S. Appl. No. 13/211,082 (dated Dec. 20, 2016).
Non-Final Office Action for U.S. Appl. No. 14/455,453 (dated Dec. 15, 2016).
Final Office Action for U.S. Appl. No. 13/669,346 (dated Dec. 1, 2016).
Korean Office Action with Translation for Korean Patent Application No. 10-2016-7026352 (dated Nov. 21, 2016).
Patent Examination Report No. 2 fo Australian Patent Application No. 201521823 (dated Nov. 18, 2016).
Notice of Decision from Post-Prosecution Pilot Program (P3) Conference for U.S. Appl. No. 12/406,916 (Oct. 20, 2016).
Summons to attend oral proceedings pursuant to Rule 115(1) EPC for European Application No. 12846583.8 (dated Oct. 10, 2016).
Decision on Appeal for U.S. Appl. No. 13/118,046 (Sep. 14, 2016).
Decision to Refuse a Patent for Korean Patent Application No. 10-2011-7009841 (dated Aug. 23, 2016).
Notification of Transmittal of the International Search Report and the Written Opinion of the International Searching Authority, or the Declaration for International Application No. PCT/US2015/044231 (dated Oct. 23, 2015).
Adelya Loyalty Operator, Welcome and Plaform, http://www.adelya.com/, pp. 1-2 (Oct. 2014).
AmazonSmile, About AmazonSmile: Program Details and FAQ, http://smile.amazon.com/about, 1 page (Oct. 2014).
Choose Local Orgeon Visa, http://chooselocalvisa.com, Credit Card Rates for Choose Local Visa, https://www.unitusccu.com/personal/personal-credit-cards/rates/, 5 pages (Oct. 2014).
Groupon, Wikipedia, http://en.wikipedia.org/wiki/Groupon, pp. 1-17 (Oct. 2014).
MasterCard Marketplace, https://www.mastercard.com/US/company/en/whatwedo/.
Orange Advantage Rewards Program, About the Program and How it Works, http://orangeadvantageny.com/who-we-are/, 3 pages, (Sep. 2014).
Simon, "Credit card reward programs: a short history," captured by wayback machine Jan. 19, 2009, pp. 1-2 (Published Nov. 14, 2006).
Madlmayr et al., "Managing an NFC Ecosystem," 7th International Conference on Mobile Business, pp. 95-101 (Jul. 2008).
Advisory Action tor U.S. Appl. No. 14/455,453 (dated May 29, 2018).

Applicant-Initiated Interview Summary for U.S. Patent Application Serial. No. U.S. Appl. No. 14/455,453 (dated May 11, 2018).
Notice of Allowance and Fee(s) Due for U.S. Appl. No. 12/574,696 (dated Mar. 29, 2018).
Office Action for Indian Patent Application Serial No. IN 2686/CHENP/2011 (dated Mar. 15, 2018).
Final Office Action for U.S. Appl. No. 14/455,453 (dated Mar. 9, 2018).
Summons to attend oral proceedings pursuant to Rule 115(1) EPC for European Patent Application No. 11787521.1 (Feb. 20, 2018).
Summons to attend oral proceedings pursuant to Rule 115(1) EPC for European Patent Application No. 10754103.9 (Feb. 19, 2018).
Decision to refuse a European Patent application for European Patent Application No. 09 837 222.0 (dated Jan. 25, 2018).
Communication pursuant to Article 94(3) EPC for European Patent Application No. 09 833 865.0 (dated Dec. 11, 2017).
Summons to attend oral proceedings pursuant to Rule 115(1) EPC for European Patent Application Serial No. 09833865.0 (Jul. 23, 2018).
Non-Final Office Action for U.S. Appl. No. 15/172,123 (dated Jul. 23, 2018).
Communication pursuanto Article 94(3) EPC for European Patent Application Serial No. 09 819 787.4 (dated Jul. 12, 2018).
Non-Final Office Action for U.S. Appl. No. 13/118,046 (dated Jul. 3, 2018).
Final Office Action for U.S. Appl. No. 15/172,123 (dated Dec. 4, 2018).
Decision to refuse a European Patent application for European Patent Application Serial No. 15 165 149.4 (dated Nov. 16, 2018).
Non-Final Office Acton for U.S. Appl. No. 13/118,046 (dated Nov. 13, 2018).
Decision to refuse a European Patent application for European Patent Application Serial No. 11 787 521.1 (dated Nov. 7, 2018).
Decision on Appeal for U.S. Appl. No. 13/170,903 (Nov. 1, 2018).
Applicant-Initiated Interview Summary for U.S. Patent Application Serial No. 15/172,123 (dated Oct. 23, 2018).
Non-Final Office Action for U.S. Appl. No. 12/406,916 (dated Oct. 4, 2018).
Result of consultation for European Patent Application No. 11 787 521.1 (Sep. 26, 2018).
Office Action for Indian Patent Application Serial No. 5233/CHENP/2011 (dated Sep. 24, 2018).
Decision to refuse a European Patent application for European Patent Application Serial No. 10 754 103.9 (dated Aug. 10, 2018).
Summons to attend oral proceedings pursuant to Rule 115(1) EPC for European Patent Application Serial No. EP15165149.4 (Jan. 19, 2018).
Advisory Action for U.S. Appl. No. 14/520,265 (dated Oct. 2, 2017).
Decision to Refuse a European Patent Application for European Application Serial No. 13 780 892.9 (dated Jan. 9, 2020).
Decision of Rejection for Chinese Patent Application Serial No. 201610238147.3 (dated Jan. 3, 2020).
Examination Report for Australian Application Serial No. 2017274295 (dated Oct. 2, 2019).
Advisory Action for U.S. Appl. No. 13/118,046 (dated May 31, 2019).
Advisory Action for U.S. Appl. No. 15/172,123 (dated Apr. 11, 2019).
Examiner's Answer to Appeal Brief for U.S. Appl. No. 12/406,916 (dated Dec. 2, 2019).
Result of consultation for European Application Serial No. 13 780 892.9 (Oct. 21, 2019).
Notification of the Second Office Action for Chinese Patent Application Serial No. 201610238147.3 (dated Sep. 24, 2019).
Notice of Granting Patent Right for Invention for Chinese Application Serial No. 201610545858.5 (dated Sep. 6, 2019).
Communication pursuant to Article 94(3) EPC for European Application Serial No. 11 818 673.3 (dated Aug. 9, 2019).
Communication pursuant to Article 94(3) EPC for European Application Serial No. 09 819 787.4 (dated Aug. 9, 2019).
Notice of Allowance and Fee(s) Due for U.S. Appl. No. 15/688,270 (dated Aug. 6, 2019).

(56) References Cited

OTHER PUBLICATIONS

Decision of Rejection for Chinese Patent Application Serial No. 201610770773.7 (dated Jul. 2, 2019).
Communication Pursuant to Article 94(3) EPC for European Patent Application Serial No. 11818673.3 (dated Nov. 16, 2020).
Communication Pursuant to Article 94(3) EPC for European Patent Application Serial No. 09819787.4 (dated Nov. 16, 2020).
Official Letter Notifying Grant and Patent Certificate for Indian Patent No. 352836 (dated Feb. 12, 2020).
Summons to Oral Proceedings Pursuant to Rule 115(1) EPC for European Patent Application Serial No. 09807223.4 (Oct. 30, 2020).
Blaze Mobile Wallet, "A revolutionary integrated, consumer centric, and user friendly mobile application," (Jan. 2008).
Notice of Allowance for U.S. Appl. No. 12/406,916 (dated Dec. 23, 2020).
Examination Report for Australian Patent Application Serial No. 2017274295 (dated Sep. 30, 2020).
Hearing Notice for Indian Patent Application Serial No. 1560/CHENP/2011 (Sep. 22, 2020).
Decision on Appeal for U.S. Appl. No. 12/406,916 (Sep. 18, 2020).
Examination Report for Australian Patent Application Serial No. 2017274295 (dated Jul. 21, 2020).
Hearing Notice for Indian Patent Application Serial No. 2686/CHENP/2011 (Jan. 15, 2021).
Patent Certificate for Indian Patent No. 352836 (Dec. 2, 2020).
Boards of Appeal Decision for European Patent Application Serial No. 09807223.4 (Feb. 12, 2021).
Boards of Appeal Decision for European Patent Application Serial No. 09837222.0 (May 11, 2021).
Notification of Reexamination for Chinese Application Serial No. 201610770773.7 (Feb. 24, 2021).
Decision on Appeal for U.S. Appl. No. 15/172,123 (Feb. 23, 2021).
Hearing Notice of Indian Application Serial No. 5233/CHENP/2011 (Feb. 4, 2021).
Notification of Reexamination for Chinese U.S. Appl. No. 15/172,123.7 (dated Feb. 24, 2021).
Final Office Action for U.S. Appl. No. 13/118,046 (dated Mar. 19, 2019).
Notification of the First Office Action for Chinese Patent Application Serial No. 201610545858.5 (dated Mar. 1, 2019).
Summons to attend oral proceedings pursuant to Rule 115(1) EPC for European Application Serial No. 13780892.9 (Feb. 28, 2019).
Decision on Appeal for U.S. Appl. No. 13/211,082 (Feb. 27, 2019).
Notification of the First Office Action for Chinese Patent Application No. 201610770773.7 (dated Dec. 29, 2018).
Notice of Allowance for Canadian Patent Application Serial No. 2,734,176 (dated Nov. 20, 2018).
First Examination Report for Indian Patent Application Serial No. 1560/CHENP/2011 (dated Oct. 30, 2018).
Examiner's Answer for U.S. Appl. No. 15/172,123 (dated May 28, 2019).
Final Office Action for U.S. Appl. No. 12/406,916 (dated Apr. 24, 2019).
Decision to Refuse refuse a European Patent application for European Patent Application No. 09833865.0 (dated Mar. 27, 2019).
Notification of the First Office Action for Chinese Patent Application Serial No. 201610238147.3 (dated Mar. 5, 2019).
Communication pursuant to Article 94(3) EPC for European Patent Application No. 09 837 222.0 (dated Apr. 18, 2016).

Advisory Action Before the Filing of an Appeal Brief for and Applicant-Initiated Interview Summary for U.S. Appl. No. 13/669,346 (dated Apr. 18, 2016).
Letter Regarding Decision of Reexamination for Chinese Patent Application No. 200980148141.5 (dated Apr. 12, 2016).
Office Action for Canadian Patent Application No. 2,755,832 (dated Apr. 6, 2016).
Examiner's Answer for U.S. Appl. No. 13/118,046 (dated Apr. 4, 2016).
Notice of Allowance and Fee(s) for U.S. Appl. No. 12/574,696 (dated Mar. 29, 2016).
Patent Board Decision for U.S. Appl. No. 12/574,696 (Mar. 24, 2016).
Notice of Grant for Chinese Patent Application No. 200980157050.8 (dated Feb. 3, 2016).
Communication pursuant to Article 94(3) EPC for European Patent Application No. 12846583.8 (dated Jan. 22, 2016).
Extended European Search Report for European Application No. 13780892.9 (dated Jan. 15, 2016).
Letter Regarding Notice of Allowance for Mexican Patent Application No. MX/a/2011/003425 (dated Jan. 11, 2016).
Non-Final Office Action for U.S. Appl. No. 13/170,903 (dated Jan. 8, 2016).
Office Action for Canadian Application No. 2,734,176 (dated Jan. 6, 2016).
Final Office Action for U.S. Appl. No. 13/669,346 (dated Dec. 30, 2015).
Communication pursuant to Article 94(3) EPC for European Patent Application No. 11787521.1 (dated Dec. 17, 2015).
Notification of Reexamination for Chinese Application No. 200980148141.5 (dated Nov. 23, 2015).
Letter Regarding Office Action for Korean Patent Application No. 2011-7009841 (dated Nov. 6, 2015).
Notification of the Reexamination for Chinese Application No. 200980140368.5 (dated Oct. 28, 2015).
Letter Regarding Final Rejection for Japanese Patent Application No. 2011-531127 (dated Oct. 26, 2015).
Communication pursuant to Article 94(3) EPC for European Application No. 11 804 128.4 (dated Oct. 23, 2015).
Certificate of Grant for Australian Patent Application No. 2009282041 (dated Oct. 22, 2015).
Oral Hearing Notice for Indian Patent Application No. 1752/CHENP/2009 (Oct. 13, 2015).
Third Office Action for Chinese Patent Application No. 200980157050.8 (dated Oct. 9, 2015).
Notification of European publication number and information on the application of Article 67(3) EPC for European Patent Application No. 15165149.4 (dated Sep. 30, 2015).
Office Action for Mexican Patent Application No. 2011003425 (dated Sep. 6, 2015).
Extended European Search Report for European Application No. 15165149.4 (dated Aug. 27, 2015).
Langer et al., "Anwendungen und Technikvon Near Field Communication (NFC)," Springer, 275 pages (2010).
Boards of Appeal Decision for European Patent Application Serial No. 09837222.0 (dated Apr. 26, 2021).
Decision of Reexamination for Chinese Patent Application Serial No. 201610770773.7 (dated Jun. 29, 2021).
Hearing Notice for Indian Patent Application Serial No. 5233/CHENP/2011 (dated Aug. 31, 2021).

* cited by examiner

METHODS, SYSTEMS AND COMPUTER READABLE MEDIA FOR OVER THE AIR (OTA) PROVISIONING OF SOFT CARDS ON DEVICES WITH WIRELESS COMMUNICATIONS CAPABILITIES

PRIORITY CLAIM

This application is a continuation-in-part of U.S. patent application Ser. No. 12/340,568, filed Dec. 19, 2008, which is a continuation-in-part of U.S. patent application Ser. No. 11/514,698 (now U.S. Pat. No. 7,469,151), filed Sep. 1, 2006; the disclosures of which are incorporated herein by reference in their entireties.

TECHNICAL FIELD

The subject matter described herein relates to provisioning of soft cards or other credentials on devices with wireless communications capabilities. More particularly, the subject matter described herein relates to methods, systems, and computer readable media for over the air (or over IP network) provisioning of soft cards on devices with wireless communications capabilities.

BACKGROUND

Conventional physical payment cards (branded or proprietary), member cards, and loyalty cards are typically provisioned in a physical secure environment controlled by the card issuer. For example, the card issuer may have a secure facility where cards are provisioned before being sent to users. When a user receives a card, the user typically contacts the card issuer by telephone to activate the card.

In order to eliminate the need for users to carry physical cards, card issuers have begun issuing soft cards. As used herein, the term "soft card" refers to a software-implemented entity for facilitating transactions, such as payment transactions. Examples of soft cards include payment cards, such as credit cards, debit cards, prepaid cards, e-purse cards, transit cards, loyalty cards, member cards, identification cards (including door keys), other payment and non-payment cards, coupons, promotions, tickets (such as tickets for transit, parking, movies, events and others).

A soft card may be provisioned on a device with wireless communications capabilities. Devices with wireless communication capabilities may interact with local card readers to enable transactions involving the soft card. Examples of devices with wireless communications capabilities include mobile phones, smart phones, key fobs, physical cards, and personal digital assistants with interfaces to local card readers. Interactions between a device and a reader may occur via an electric and/or magnetic field between the device and the reader. One type of communications channel that may be used between a device capable of supporting a soft card and a card reader for payment or redemption transactions is radio frequency (RF) enabled near field communications (NFC) or contactless. Near field communications typically occur at a distance of within about one wavelength of the communications radio frequency being used between the device and the contactless card reader. An example of a contactless communications protocol that may be used in communications between a device capable of supporting a soft card and a contactless card reader is an ISO 14443 or ISO 18092 interface.

Devices with wireless communications capabilities may also be capable of data communications with remote entities. For example, devices with wireless communications capabilities may implement secure hypertext transfer HTTP(s) over transmission control protocol/Internet protocol (TCP/IP), short message service point to point (SMS PP), and/or card application toolkit transport protocol (CAT_TP) over an air interface for communicating with remote entities. The air interface protocol used by a device with wireless communications capabilities may vary with the device. Examples of air interface protocols that may be used include GSM, GPRS, CDMA, Bluetooth, etc.

In order to utilize a soft card on a device with wireless communications capabilities, the soft card must be provisioned or loaded onto the device. One possible solution for provisioning soft cards on mobile devices is to provision the devices at a secure facility controlled by the card issuer. However, it is impractical to require users to bring their mobile phones or PDAs to a card issuer location for secure provisioning. Accordingly, one conventional provisioning method involves the user calling the card issuer and requesting a soft card. A human operator or a call center at the card issuer obtains user information. The card issuer validates the user and enqueues soft card provisioning requests for multiple users. When a batch of soft card provisioning requests has been obtained by the card issuer, the card issuer provisions the cards as a batch. The time from a soft card request until batch provisioning can range from 3 to 20 days. Such a delay is undesirable for users who desire to use their soft cards immediately.

Another problem with conventional card provisioning systems is that the systems are not scalable. For example, card-issuer-specific provisioning systems communicate with back end network devices using proprietary protocols. There is believed to be no system that is capable of provisioning cards issued by different card issuers using a single point of contact for mobile devices.

Accordingly, in light of these problems with conventional soft card provisioning methods, there is a need for improved methods, systems, and computer readable media for over the air provisioning of soft cards on devices with wireless communications capabilities.

SUMMARY

Methods, systems, and computer readable media for over the air provisioning of soft cards on devices with wireless communications capabilities are disclosed. According to one method, a soft card provisioning application is instantiated on a device with wireless communications capabilities. A card number for a soft card desired to be provisioned on the device is obtained from the user of the device. The first 8 digits of card number representing the issuer identification number (IIN) or bank identification number (BIN) are communicated to a provisioning configuration server over an air interface. The IIN could vary from 4 digits to 8 digits.

A provisioning issuer server network address is obtained from the provisioning configuration server corresponding to the issuer identification number (IIN). A connection is made to the provisioning issuer server corresponding to the network address. The complete card number is communicated to a provisioning issuer server. Card-issuer specific challenges corresponding to the card number are obtained from the provisioning issuer server. The challenges are presented to the user, and the user's responses to the challenges are received. The challenge responses are communicated to the provisioning issuer server. Soft card personalization data along with branding image, marketing data, card embossing and imprint data, account summary data for provisioning the soft card is received from the provisioning issuer server. The soft card is provisioned for use on the device based on the personalization data.

The provisioning of a soft card over the air interface may occur over wireless connection, for example, using secure hypertext transfer protocol (HTTP(s)), Internet protocol (IP), and transmission control protocol (TCP) protocols, short message service point to point (SMS PP), and card application toolkit transport protocol (CAT_TP). The wireless connection may also include a WiFi connection. A TCP socket may be created for the provisioning connection in case of hypertext transfer protocol HTTP(s) and TCP protocols. SMS PP, and CAT_TP can be used together if CAT_TP is being used for provisioning. If SMS PP is being used for the provisioning, then CAT_TP will not be used. The physical layer of the connection may utilize, CDMA, Bluetooth, GPRS, or GSM air interface protocols. Provisioning may occur over the Internet or over a corporate or other intranet or through SMS or CAT_TP. Provisioning may be direct, in that provisioning does not require a voice call. That is, the device user may not be required to call a card issuer or a third party to initiate card provisioning. Provisioning may occur automatically by providing a provisioning application on a mobile device that establishes a connection with a provisioning configuration server in response to being started. Eliminating the need for the user to initiate a voice call to provision a soft card reduces the time required for the provisioning process.

The methods and systems described herein for over the air provisioning of soft cards on devices with wireless communications capabilities can be implemented using a computer readable medium having stored thereon computer executable instructions that when executed by the processor (e.g., a hardware-based processor or processing unit) of a computer control the computer to transform a non-provisioned mobile device to a device provisioned with a soft card for visual display and used by the mobile device user. Exemplary non-transitory computer readable media suitable for implementing the subject matter described herein include chip memory devices, disk memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
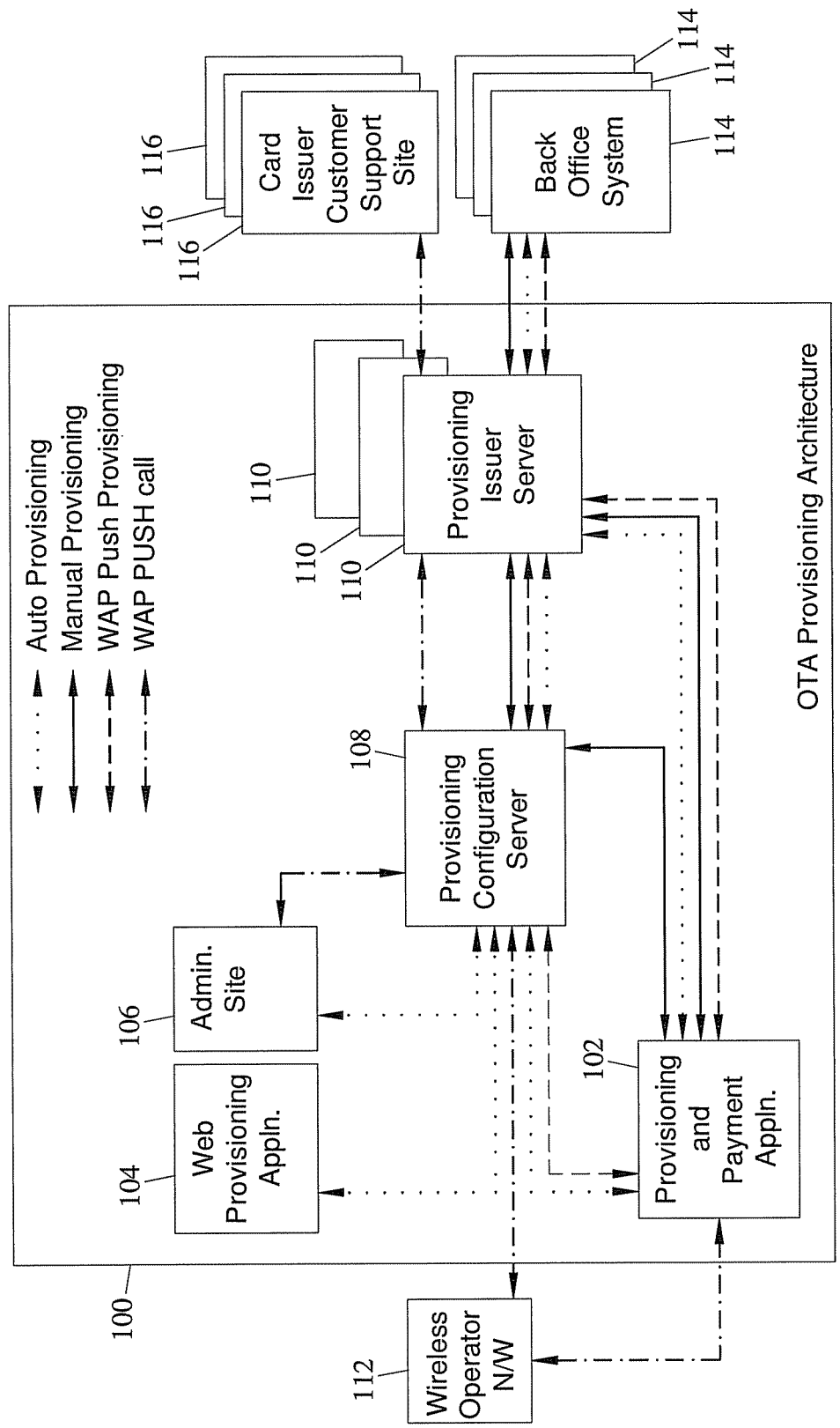
FIG. 1 is a block diagram of a system for over the air provisioning of a soft card on a device with wireless communications capabilities according to an embodiment of the subject matter described herein.

FIG. 1 is a block diagram of a provisioning system for provisioning soft cards on devices with wireless communications capabilities according to an embodiment of the subject matter described herein. Referring to FIG. 1, system 100 includes a provisioning and payment application 102, a web provisioning application 104, an administrative site 106, a provisioning configuration server 108, and one or more provisioning issuer servers 110 hosted in card issuer locations. Provisioning and payment application 102 may reside on a device with wireless communication capabilities, such as a mobile telephone, a smart phone, or a personal digital assistant. A wireless network operator 112 may provide the pathway for provisioning communications with provisioning and payment application 102. This pathway may be an IP connection that is separate from a voice call, eliminating the need for users to initiate provisioning using voice calls.

Provisioning and payment application 102 may provide a user interface for the end user to initiate the provisioning of one or more soft cards or applications that reside on the wireless communications device. Provisioning and payment application 102 may communicate with the user to obtain authentication information and may contact provisioning issuer server 110 to obtain soft card personalization data or application data. In one embodiment, the provisioning issuer server is associated with an issuer of a soft card or application. As used herein with respect to the present subject matter, a soft card may refer to an electronic version of a physical card or a credential representing a card, wherein a credential comprises a low or high security credential (e.g., an account number and associated secret data, issuer secret key(s), shared secret between issuer and account holder, issuing and/or expiration date, number of times the use of the soft card/application is allowed, a personal identification number, a password, biometric data, etc.) that is associated with an electronic coupon, offer, reward, payment card, a passport, and the like. In one embodiment, a soft card and/or application includes an account number, its associated personalization data, and associated card image. Examples of soft cards and/or applications (which may be provided over a secure channel) include, but are not limited to, a payment card, a credit card, a debit card, a prepaid card, an e-purse card, a transit card, a loyalty card, a member card, an identification card, a door key card, a non-payment card, a coupon, a promotion, a driving license, a national identification card, a passport, a movie ticket, a parking ticket, a transit ticket, and an event ticket. Exemplary steps performed by provisioning and payment application 102 will be described in further detail below. Provisioning and payment application 102 is also referred to herein as "provisioning application," since payment functionality is not essential to explaining the subject matter described herein. In one embodiment, an application may include an entity that is not linked to a physical card, but instead is linked to a person or a cloud-based payment account.

Web provisioning application 104 may allow a user to perform one or more steps required for provisioning the soft card via a web interface. Web provisioning application 104 may reside on a web server associated with an entity that is separate from the card issuer. Web provisioning application 104 may allow a user to provision multiple cards in one provisioning transaction. For example, web provisioning application 104 may be used to securely provision multiple instances of the same soft card type application (e.g., securely provision multiple soft cards, An example of this secure provisioning may include a user downloading his or her electronic credit card, debit card and prepaid cards of MasterCard applications from the same or different card issuers). Exemplary detailed steps performed by web provisioning application 104 will be described below.

Administration site 106 may provide customer support for provisioning soft cards on handheld devices. The functionality of administration site 106 is not essential to the subject matter described herein. Hence, additional detail will not be provided.

Provisioning configuration and secured memory management server 108, which is also referred to as a secure element trusted service manager (SE-TSM) server, may store configuration and business process information for a plurality of different card and/or application issuers. For example, provisioning configuration server 108 may receive soft card provisioning requests from provisioning and payment application 102. In one embodiment, the soft card provisioning request is initiated by the mobile device user. For example, the soft card (e.g., a payment or non-payment soft card) provisioning request is made by a mobile device user utilizing a mobile device equipped with a provisioning and payment application 102. In another embodiment, the soft card provisioning request is initiated by a provisioning issuer server 110 (e.g., associated with a service provider entity) which sends a message (e.g., a SMS message, a wireless data request packet, etc.) directing the mobile device to issue the provisioning request to provisioning configuration server 108. For example, application 102 may be triggered to send the provisioning request to provisioning configuration server 108 or may prompt the user to initiate the provisioning process.

In one embodiment, provisioning configuration server 108 may identify the card issuer associated with the request based on an Issuer Identification Number (IIN) of card number or an identifier provided in the request. Provisioning configuration server 108 may provide a single point of contact for mobile device users to provision soft cards. In addition, provisioning configuration server 108 may be configured to communicate with multiple card issuers. As a result, provisioning configuration server 108 provides an easy-to-use, scalable solution to soft card provisioning. In one embodiment, provisioning configuration server 108 is associated with the management of applications or soft cards and their life cycle in the secure element or other memory (e.g., baseband memory or non-secure memory) in a mobile device.

According to another aspect of the subject matter described herein provisioning configuration server 108 may perform phone lifecycle management, secure domain lifecycle management, card issuer configuration management, and secure domain key management. Secure domain lifecycle management and secure domain key management will be described in detail below. Phone lifecycle management actions that may be performed by provisioning configuration server 108 includes operations that are performed when a user's phone is lost or stolen, including authenticating the secure element associated with the new phone and preventing use of the secure element associated with the old phone. As used herein, secure element (SE) may include a secure memory (storage) that can be embedded in a mobile device (e.g., a cellular/mobile smartphone, a hardware computing tablet, a portable personal computer, a personal digital assistant (PDA), key fob, a physical card, and the like), in a trust zone area in the mobile device or tablet, in a SIM (Subscriber Identification Module) of the mobile device or tablet, or in an add-on MicroSD device. Card issuer configuration management operations that may be performed by provisioning configuration server 108 include managing provisioning issuer server configuration and address information for each card issuer.

Provisioning issuer servers 110 (also referred to as service provider trusted service manager (SP-TSM) servers 110) may reside at each different card issuer and may be integrated with each card issuer back office system to provide card provisioning data, card image data, challenge questions and card financial information, such as account balance, rewards, pre-printed information on the card and personalized embossed information (expiration date, CW, name on the card, PAN). For a soft card, the card image and the pre-printed and personalized embossed information may be displayed to the user via a graphical user interface associated with the device. Other soft card personalization data that may be obtained from provisioning issuer servers 110 over the air interface includes issuer marketing data including card type, account type, member since, issuer specific data including customer support number, issuer URL, issuer name, and network supported. In one embodiment, the over the air interface may include a WiFi interface or an interface that utilizes Internet protocol, among others. Provisioning issuer servers 110 may communicate with provisioning and payment application 102 to authenticate a user and to deliver a card instance (e.g., personalization data, account number, etc.), customer support data, and card image information to application 102. As used herein, a soft card instance includes personalization data of a card, such as the account number, the issuer secret data, issuer secret key, start and expiration date, personal identification code or password, biometric data, and any other discretionary data. Notably, an instance represents unique card or other application data. An instance may be associated with an electronic soft card, an electronic coupon, an electronic offer, an electronic cloud based payment, an electronic driving license, and the like. In one embodiment, the soft card customer support data (typically printed at the back of a physical card) and the card image information (e.g., image of a MasterCard Citi card as printed on the front and/or back of a card) may be stored by application 102 into baseband memory where an association is established with an instance of the soft card (or application) stored in secured memory (including the secure element). Notably, the established association enables a mobile device user to select the soft card (or application) instance stored in secure memory in the event the mobile device user selects (e.g., finger taps) the image of the associated card image displayed on the mobile device screen. In an alternative embodiment, the card image and the soft card personalization data may both be stored in baseband memory or the secured memory. Provisioning issuer server 110 may also communicate with back office systems 114 and card issuer customer support sites 116. Back office systems 114 may store user's personal information and personalization data for soft cards. Customer support sites 116 may provide customer support for card issuer customers. In one embodiment, provisioning issuer server 110 is associated with the application provider (e.g., card issuer, coupon issuer, etc.) that provisions applications or soft cards into the secure element or other memory of a mobile device. In one embodiment, provisioning issuer server 110 also manages the life cycle of the applications or soft cards in the secure element.

According to another aspect of the subject matter described herein, each provisioning issuer server 110 may perform account lifecycle management, prepare the personalization data and perform secure domain management. Account lifecycle management operations that may be performed by provisioning issuer server 110 include operations that are performed when a user's credit card is lost or stolen, including blocking the old credit card and validating the new credit card. Secure Memory associated with embedded NEC and UICC/uSIM is referred to as the issuer security domain (ISD) and has an issuer card manager key to manage the ISD. The issuer security domain can be divided in multiple secondary or sub security domains, each with its own card manager key to manage these security domains. ISD can create or delete the sub-security domains but can not access the data inside the sub-security domain. Security domain management will allow ISD to create, delete, increase memory allocation, decrease memory allocation, assign temporary security domain key (card manager key), assign security domain to application provider. It is these operations associated with managing security domain and sub-domains that may be performed by provisioning issuer server 110.

In the example illustrated in FIG. 1, the dotted arrows represent automatic provisioning, which is provisioning that involves web application 104 and then using provisioning and payment application 102 to provision multiple cards with single request using web application user name and password. In one embodiment, automatic provisioning may be used to reestablish an already existing wallet application in a new phone through a single request to download all of the cards present in the wallet application from a previous mobile device (e.g., a lost/stolen/broken/replaced phone). The solid arrows represent manual provisioning, which is provisioning of individual cards one at a time using provisioning and payment application 102. The remaining arrows represent WAP push provisioning, which will be described in detail below.

Figure 2:
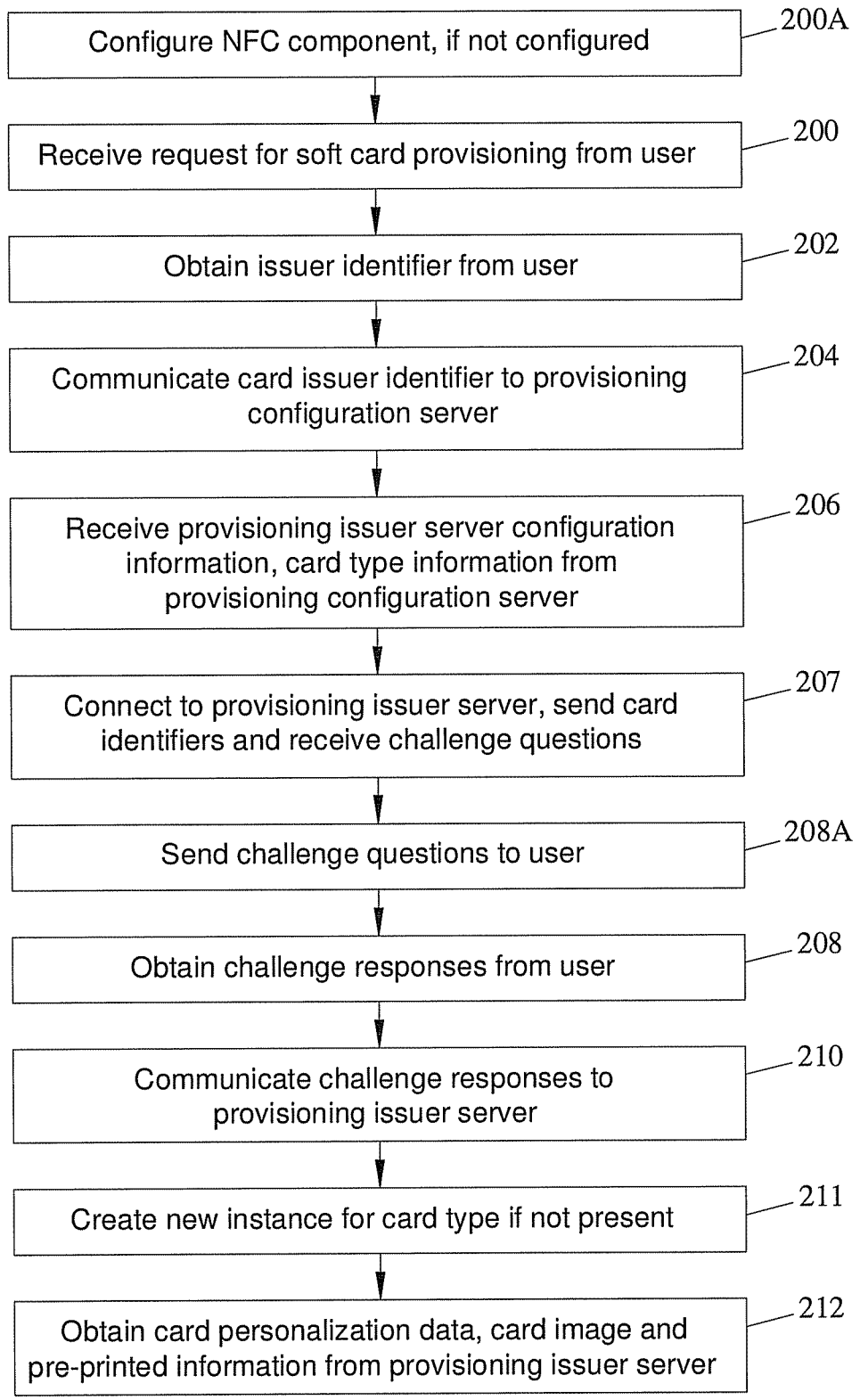
FIG. 2 is a flow chart illustrating exemplary overall steps for manually provisioning a soft card from the perspective of a soft card provisioning application according to an embodiment of the subject matter described herein.

FIG. 2 is a flow chart illustrating exemplary overall steps for provisioning the soft card on a device with wireless communication capabilities according to an embodiment of the subject matter described herein. The steps in FIG. 2 may be preformed by provisioning and payment application 102 and/or web provisioning application 104. The steps illustrated in FIG. 2 are intended to be generic with regard to automatic or manual provisioning. Referring to FIG. 2, in step 200A, if device is used for first time, provisioning and payment application 102 will configure a secure and/or non-secure memory embedded in the device along with a near field communication component. The memory may be any memory present in the device as one of: embedded memory, a universal subscriber identity module (uSIM) part of a universal integrated circuit card (UICC), a subscriber identification module (SIM), a removable element, and device memory. The memory may be used to store soft card personalization data. This process may not be repeated for a returning user of provisioning and payment application 102. In step 200, a request for soft card provisioning is received from the user. For manual provisioning, this step may be performed by provisioning and payment application 102. For automatic provisioning, the step may be performed by web provisioning application 104. In one embodiment, the web provisioning application 104 may include an online banking site (e.g., an Internet based web site), a merchant site, a mobile operator site, or a service provider site. Similarly, provisioning and payment application 102 may include or function with a mobile banking application located on a mobile device. Notably, the online banking site, the mobile banking application, or similar application may be used to enable a customer to initiate the provisioning of a payment soft card (associated with the banking institution) on a mobile device. In one embodiment, a user associated with the mobile device may also make a request, using the mobile device or a personal computer, for provisioning the payment soft card via an online request via web provisioning application 104. For example, the user may utilize online fill-out forms from the online banking site.

In step 202, the card issuer identifier is obtained from the user. The issuer identifier may be the Issuer identification number (IIN) of the personal account number (PAN) associated with the soft card request. For manual provisioning, step 202 may be performed by provisioning and payment application 102. For automatic provisioning, step 202 may be performed by web provisioning application 104.

In step 204, the issuer identifier is communicated to provisioning configuration server 108. In one exemplary implementation, provisioning configuration server 108 may have a 1 to n relationship with provisioning issuer servers 110. Accordingly, provisioning and payment application 102 and/or web provisioning application 104 may be configured with contact information for a single provisioning configuration server 108. Eliminating the need for provisioning and payment application 102 and/or web provisioning application 104 to be preconfigured with multiple card issuer identifications allows different cards issued by different issuers to be provisioned in a more efficient manner. In addition, using a provisioning configuration server 108 to control communications with provisioning and payment application 102, web provisioning application 104, and card issuer servers 110, makes system 100 more scalable than card-issuer-specific provisioning systems. In a manual provisioning process, step 204 may be implemented by provisioning and payment application 102. In an automatic provisioning process, step 204 may be performed by a web provisioning application 104.

In step 206, provisioning and payment application 102 receives provisioning issuer server information, and card type information, such as Paypass, Visa, and Discover for the provisioning issuer server identified by provisioning configuration server 108. In step 207, provisioning and payment application 102 may connect to provisioning issuer server 110, send card identification information and receive challenge questions. In step 208A, provisioning and payment application 102 may send all challenge questions received by provisioning issuer server 110 for a specific card issuer to the user. In step 208, provisioning and payment application 102 obtains challenge response information from the user. In step 210, provisioning and payment application 102 communicates the challenge response to the provisioning issuer server. In step 211, provisioning and payment application 102 may create an instance of card type in secure memory for personalization, if no new instance is present for card type. In step 212, provisioning and payment application 102 obtains card personalization data, card image and pre-printed card information and card embossed information from server 110.

If provisioning and payment application 102 successfully receives the card personalization data over the air interface, then provisioning and payment application 102 provisions the soft card for use on the device by storing the personalization data in memory. If provisioning and payment application 102 fails to successfully receive the soft card personalization data, provisioning and payment application 102 may read card track information from a secure chip associated with the device to obtain and display the last four digits of a card number and display a default card image, either at provisioning time or at payment time.

Figure 3A:
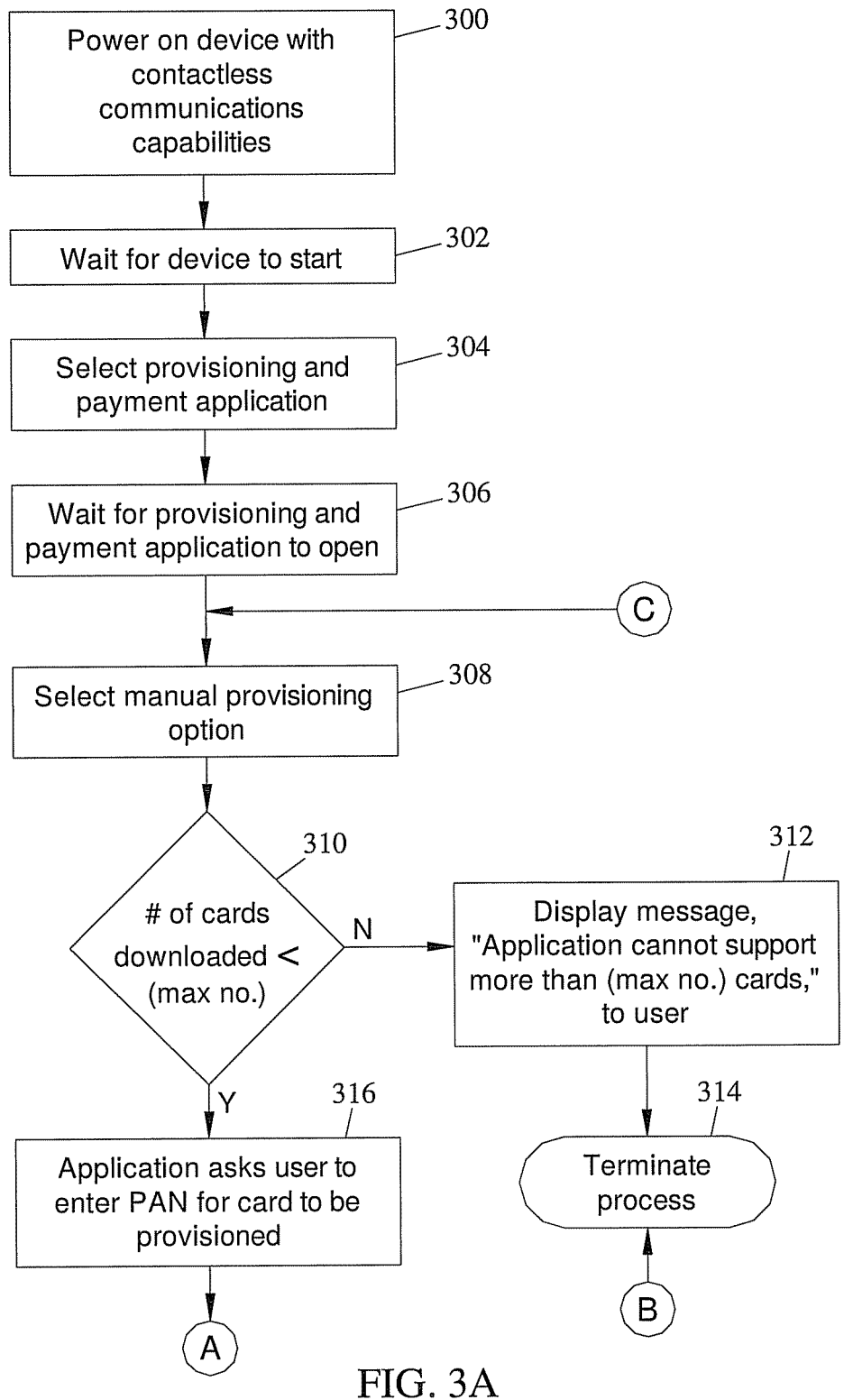
FIGS. 3A and 3B are a flow chart illustrating exemplary detailed steps for provisioning a soft card over an air interface from the perspective of a soft card provisioning application according to an embodiment of the subject matter described herein.
Figure 3B:
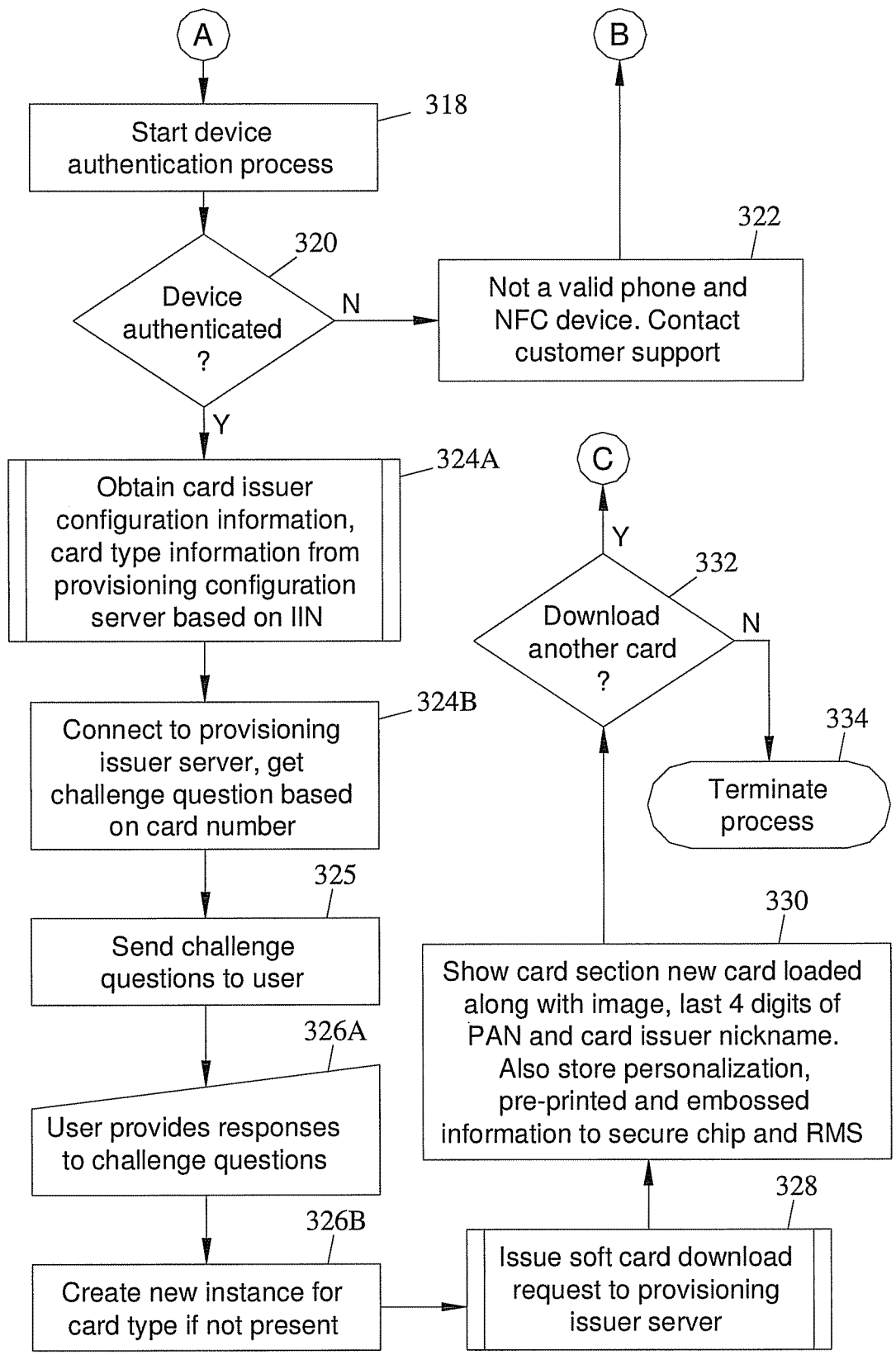

FIGS. 3A and 3B are a flow chart illustrating exemplary detailed steps performed by provisioning and payment application 102 in a manual provisioning process according to an embodiment of the subject matter described herein. Referring to FIG. 3A, in step 300, the device with wireless communication capabilities is powered on. In step 302, the user waits for the device to start. In step 304, the user selects provisioning and payment application 102. In step 306, the user waits for provisioning and payment application 102 to open.

In step 308, the user selects the manual provisioning option assuming that the near field communication component embedded with secure memory is already configured. As described above, manual provisioning includes provisioning the device with wireless communication capabilities, e.g., using the Internet (HTTP over TCP/IP), without preloading information in a web application. In step 310, application 102 determines whether the number of cards to be downloaded is less than a predetermined maximum number. The maximum number may be configurable by the developer of soft card provisioning and payment application 102. In step 312, if the number of cards to be downloaded is not less than the maximum number, control proceeds to step 314 where the manual provisioning process ends.

In step 310, if the number of cards to be downloaded is less than the maximum number, control proceeds to step 316 where application 102 asks the user to enter the PAN number for the card to be downloaded. Once the user enters the PAN number, control proceeds to step 318 in FIG. 3B where the application starts the authentication process. Detailed steps for authenticating the device will be described below. In step 320, it is determined whether the device is authenticated. If the device is not authenticated, control proceeds to step 322 where application 102 indicates that the phone is not a valid phone with a secure memory and near field communication component. Application 102 may display to the user a message to contact customer support. Control then proceeds to step 314 where the provisioning process ends.

In step 320, if the device is successfully authenticated, control proceeds to step 324A where application 102 obtains card issuer information, card type information from provisioning configuration server 108. In step 324B, provisioning and payment application 102 connects to provisioning issuer server 110 and gets challenge questions based on the card number and card issuer. In step 325, provisioning and payment application 102 may present the challenge questions to user. In step 326A, the user provides response for the challenge questions. In step 326B, provisioning and payment application 102 may create a new instance of card type if not present. In step 328, application 102 issues a soft card download request to the identified provisioning issuer server. The identified provisioning issuer server 110 may communicate with the card issuer back end network to validate the user using the challenge response information provided in the soft card download request. Once the user is validated, provisioning issuer server 110 may provide the soft card personalization data to provisioning and payment application 102. Application 102 receives the soft card personalization data from the provisioning issuer server. In step 330, application 102 displays the card image to the user with card nickname and last 4 digits of card PAN number and may store embossed information and pre-printed information in secure memory and/or record management store (RMS) respectively. In step 332, application 102 determines whether the user wants to download another card. If the user answers affirmatively, control returns to step 308 where the provisioning process restarts for the next card. If the user does not desire to download another card, control proceeds to step 334 where the provisioning process ends.

Figure 4A:
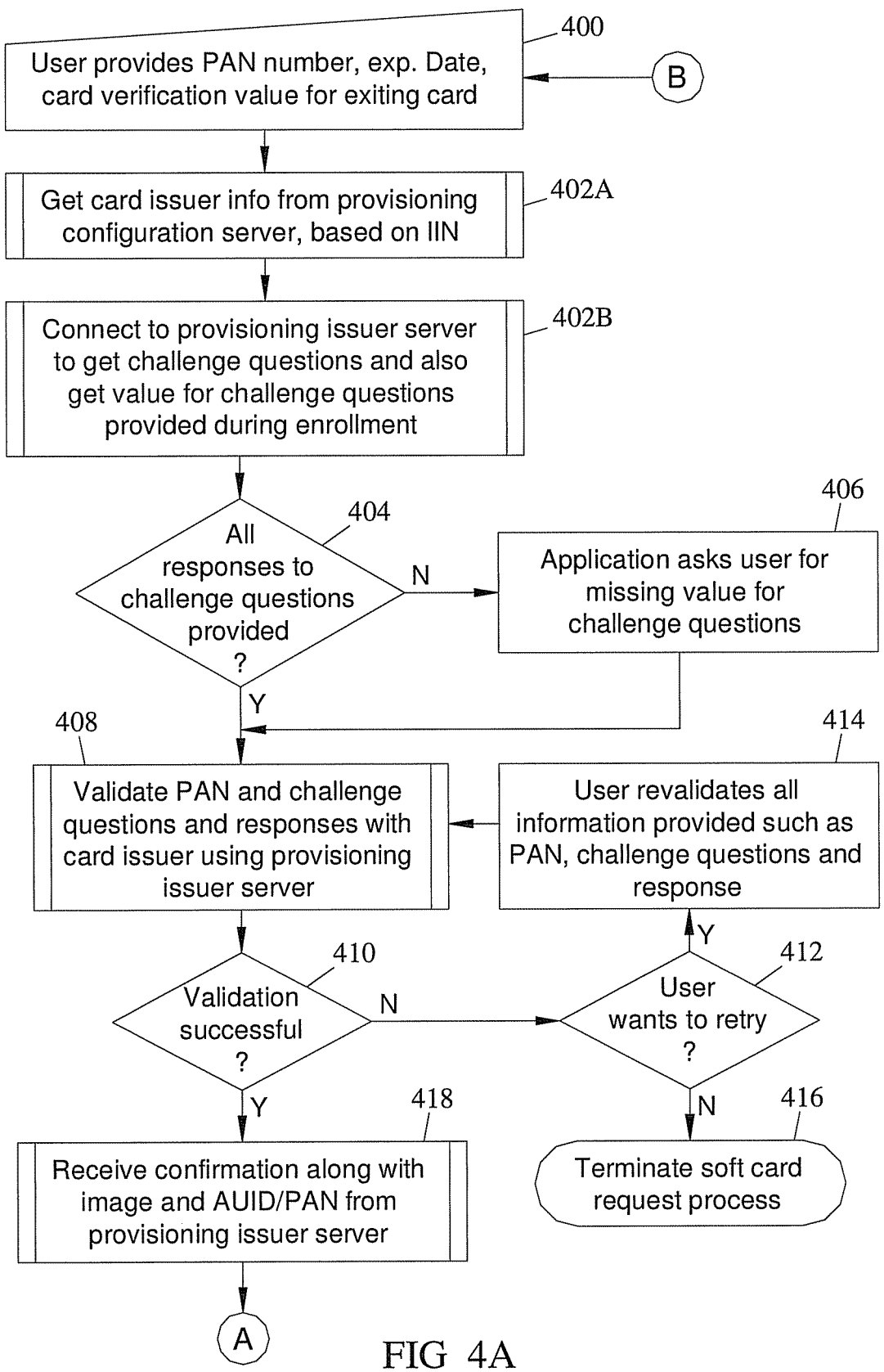
FIGS. 4A and 4B are a flow chart illustrating exemplary detailed steps for preloading provisioning information for a soft card using a web interface according to an embodiment of the subject matter described herein.
Figure 4B:
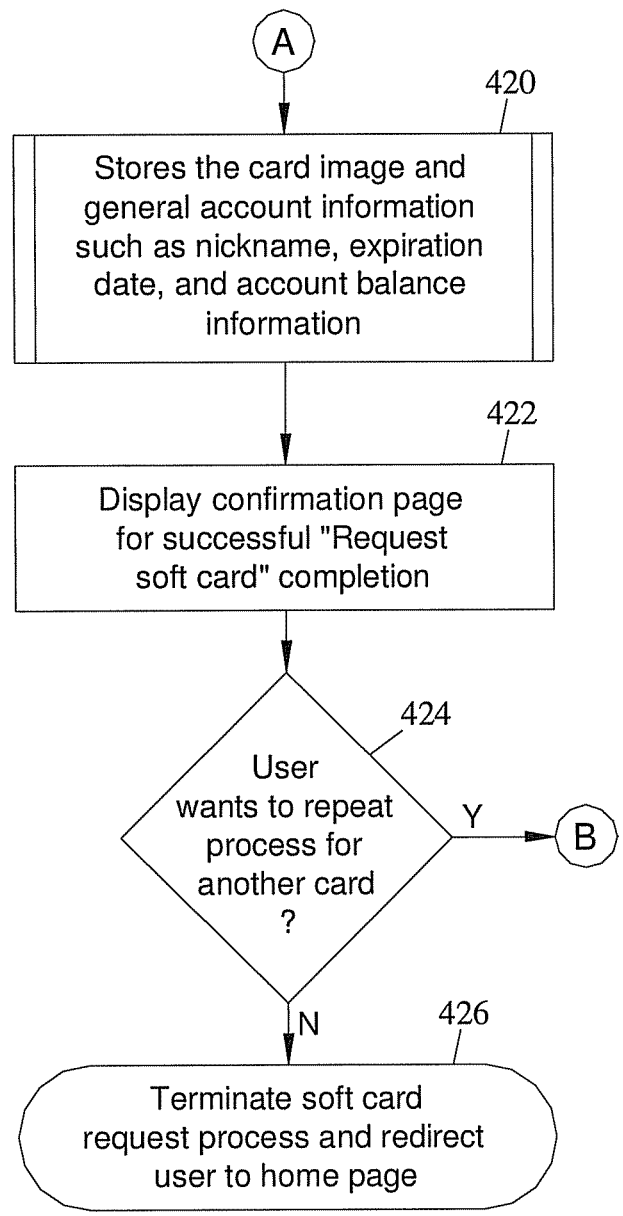

As stated above, in one implementation, a user may preload some of the information required for the provisioning process using web application 104 for a single card or for multiple cards. The process of pre-validating and preloading information in web application 104 to facilitate soft card provisioning is referred as to a soft card request. FIGS. 4A and 4B illustrates exemplary steps that may be performed using web application 104 in initiating a soft card request. Referring to FIG. 4A, in step 400, a user provides a PAN number, an expiration date, and other card verification values for a soft card desired to be provisioned. In step 402A, web application 104 communicates the card information to provisioning configuration server 108 and obtains card issuer identification information from provisioning configuration server 108. In step 402B, web application 104 connects to provisioning issuer server 110 to get challenge questions and also to obtain values for challenge questions provided during enrollment. In step 404, web provisioning application 104 determines whether responses to the challenge questions have been provided by the user during enrollment. If all responses to the challenge questions have not been provided, control proceeds to step 406 where web application 104 asks the user for missing responses to the challenge questions.

In step 408, web provisioning application 104 communicates the PAN and responses to the challenge questions to the card issuer. The card issuer validates the card information and responses to the challenge questions with user information stored in card issuer back office database provided during physical card issuance. In step 410, web provisioning application 104 determines whether the validation was successful. If the validation was not successful, control proceeds to step 412 where application 104 asks the user whether the user wants to retry. If the user selects yes, control proceeds to step 414 where the user re-enters the validation information. Validation is then reattempted by the card issuer.

If validation is successful, control proceeds to step 418 where application 104 receives confirmation of the validation, the card image, and the account user identifier and/or PAN. Referring to FIG. 4B, in step 420, application 104 stores the card image and general account information, such as nickname, expiration date, and account balance information. In step 422, application 104 displays a confirmation page indicating that the soft card request was successfully completed. In step 424, application 104 determines whether the user wants to repeat the process for another card. If the user desires to repeat the process for another card, control returns to step 400 and the steps for a soft card request are repeated. If the user does not desire to process another card, control proceeds to step 426 where the soft card request process is terminated and the user is redirected to the home page of the provisioning entity.

Figure 5A:
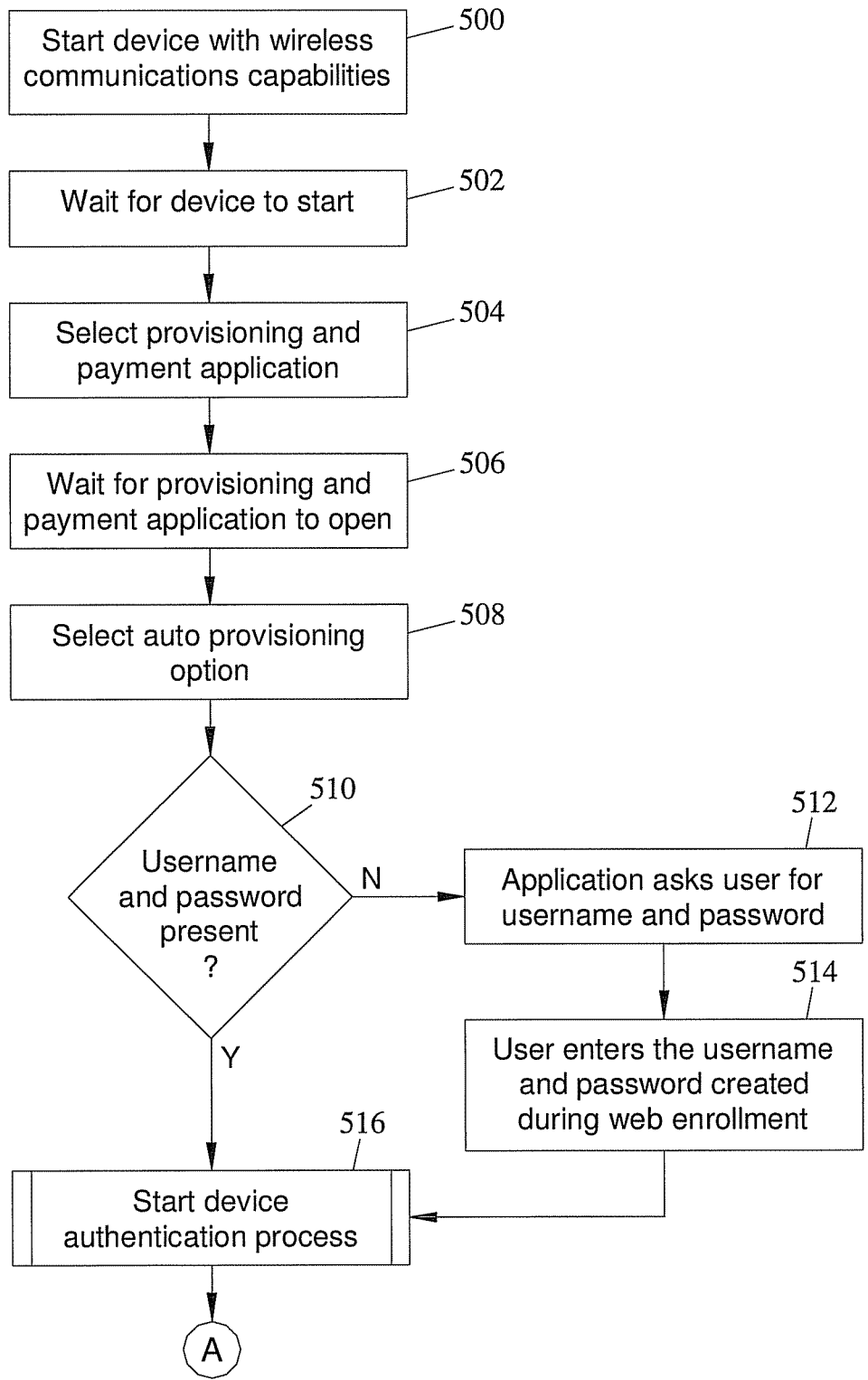
FIGS. 5A and 5B are a flow chart illustrating exemplary detailed steps performed by a soft card provisioning application for automatically provisioning a soft card according to an embodiment of the subject matter described herein.
Figure 5B:
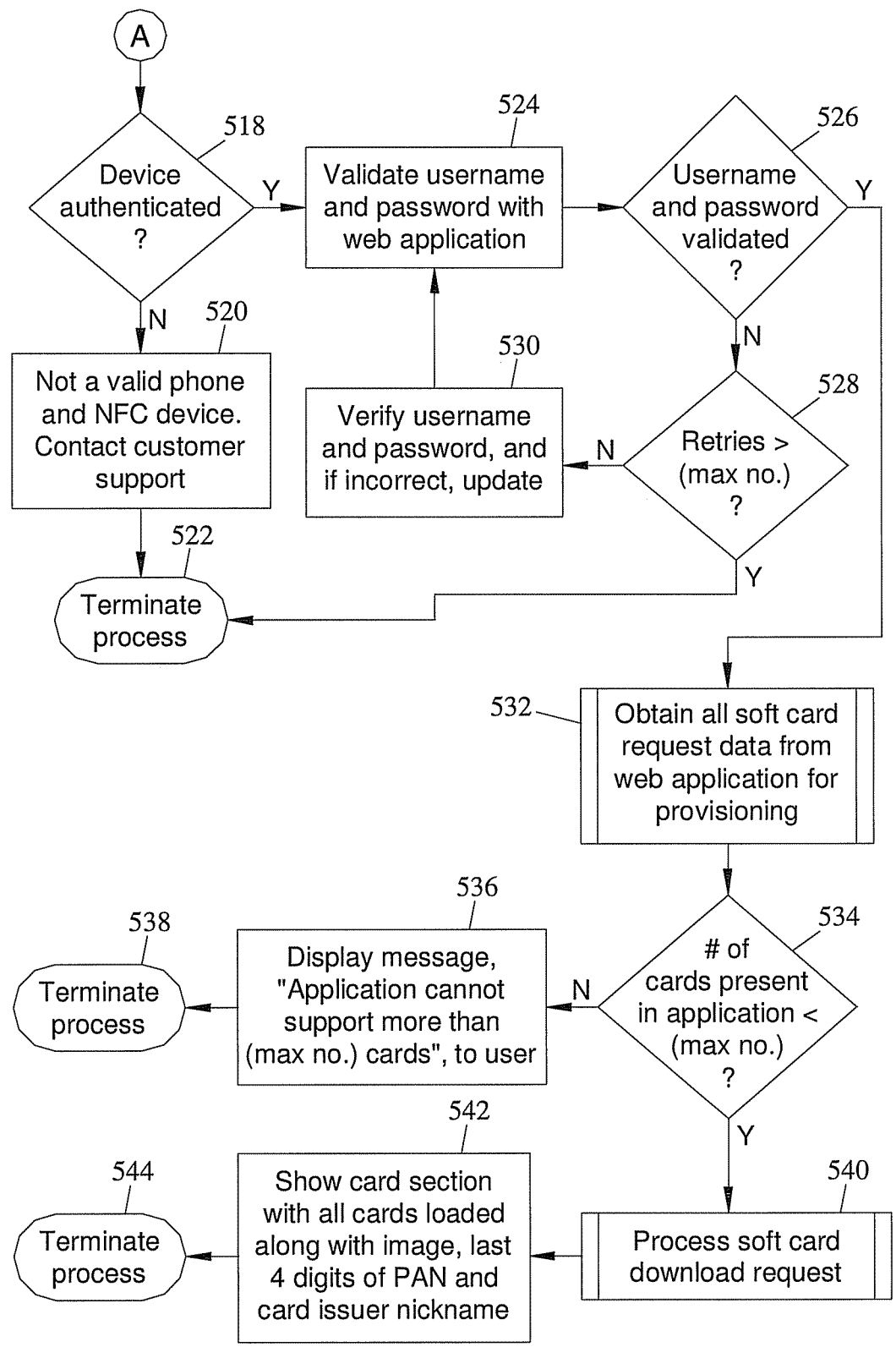

As stated above, once a user has prestored one or more soft cards using application 104 and the process illustrated in FIGS. 4A and 4B, the user may automatically provision the soft cards on his or her device with wireless communication capabilities using the auto provisioning process. FIGS. 5A and 5B are a flow chart illustrating exemplary steps that may be performed by provisioning and payment application 102 in implementing the auto provisioning process according to an embodiment of the subject matter described herein. Referring to FIG. 5A, in step 500, the user powers on the device with wireless communication capabilities. In step 502, the user waits for the device to start. In step 504, the user selects provisioning and payment application 102. In step 506, the user waits for provisioning and payment application 102 to open.

Once provisioning and payment application 102 opens, in step 508, the user selects the auto provisioning option. Control then proceeds to step 510 where it is determined whether the user's name and password associated with web application 104 are prestored on the device. If the user's name and password are not prestored on the device, control proceeds to step 512 where provisioning and payment application 102 asks the user for the user name and password. In step 514, the user enters the user name and password created during a web enrollment process. Control then proceeds to step 516 where the device authentication process starts. As described above, device authentication may include communicating with provisioning configuration server 108 to determine whether the device is authorized to receive provisioning information.

Referring to FIG. 5B, in step 518, it is determined whether the authentication was successful. If the authentication was not successful, control proceeds to step 520 where provisioning and payment application 102 indicates that the device is not a valid near field communications (or other wireless communications) handheld mobile trusted device and instructs the user to contact customer support. In step 522, the auto provisioning process ends.

Returning to step 518, if the device is successfully authenticated, control proceeds to step 524 where the user name and password are validated with web application 104 through provisioning configuration server 108. In step 526, it is determined whether the user name and password have been validated. If the user name and password have not been validated, control proceeds to step 528 where it is determined whether the retries exceed a maximum number of retries. If the retries have not exceeded the maximum number, control proceeds to step 530 where the user is prompted to enter the user name and password again.

In step 526, if the user name and password are validated, control proceeds to step 532 where the soft card request data previously stored with web application 104 for the user is downloaded to provisioning and payment application 102.

In step 534, it is determined whether the number of cards present in provisioning and payment application 102 is less than a maximum number of cards. The number is not less than the maximum number, control proceeds to step 536 where a message is displayed to the user indicating that the application cannot support more than the maximum number of cards. In step 538, the provisioning process ends.

Returning to step 534, if the number of cards present in the application is less than the maximum number, control proceeds to step 540 where the card personalization information is downloaded to the device with wireless communication capabilities. The personalization process will process one card personalization at a time, if configured number of card configured in web application 104 is greater than 1. In step 542, the device displays the card to the user. In step 544, the automatic provisioning process ends.

Figure 6:
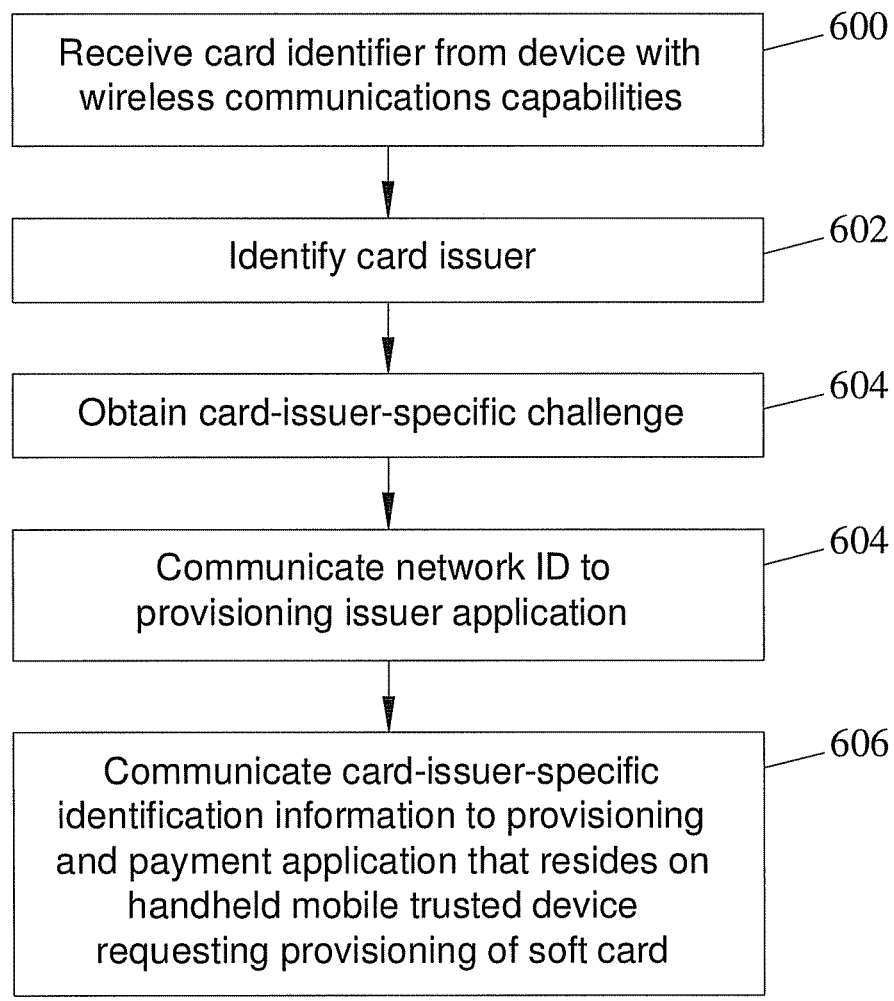
FIG. 6 is a flow chart illustrating exemplary overall steps for provisioning a soft card from the perspective of a provisioning configuration server according to an embodiment of the subject matter described herein.

As stated above, provisioning configuration server 108 acts as a point of contact for provisioning and payment application 102 and multiple different card issuers. FIG. 6 is a flow chart illustrating the exemplary overall steps that may be performed by provisioning configuration server 108 in provisioning a soft card on a device with wireless communication capabilities according to an embodiment of the subject matter described herein. Referring to FIG. 6, in step 600, provisioning configuration server 108 receives card identifier information from a device with wireless communication capabilities. In step 602, server 108 identifies the card issuer by performing a look up in a database that matches the issuer identification number (IIN) (retrieved from the PAN) numbers to card issuers. Table 1 shown below illustrates exemplary entries that may be included in such a database.

TABLE 1

| IIN Number to Card Issuer Mappings | |
|---|---|
| IIN Number | Provisioning Issuer Server IP Address |
| XXXXXX-XXXXYY | 128.128.0.1 |
| AAAAAA-AAAABB | 128.256.0.1 |
| EEEEEE-EEEEFF | 192.128.0.1 |
| JJJJJJ-JJJJKK | 192.256.0.1 |

In Table 1, the first column includes the IIN number range. The entries illustrated in Table 1 containing alphabetic characters are intended to represent the numeric characters that correspond to an IIN number. As stated above, an IIN number is an issuer identification number of the card issuer issued by ISO. The issuer identification number may be associated with a credit, debit, or charge card. The IIN number is usually the first 3-6 digits of the PAN printed on the face of a physical card or on a graphical image of a soft card. The second column in Table 1 indicates provisioning issuer server IP addresses or fully qualified domain name (FQDN) for different provisioning issuer servers. Provisioning configuration server 108 may provide this information to provisioning and payment application 102 to allow provisioning and payment application 102 to establish secure communication and obtain the soft card personalization data.

In step 604, provisioning configuration server 108 retrieves card-issuer-specific configuration from the database configured for specific card issuer. In step 606, provisioning configuration server 108 communicates the card-issuer-specific identification information to the provisioning and payment application 102 that resides on the handheld mobile trusted device requesting provisioning of the soft card.

Figure 7A:
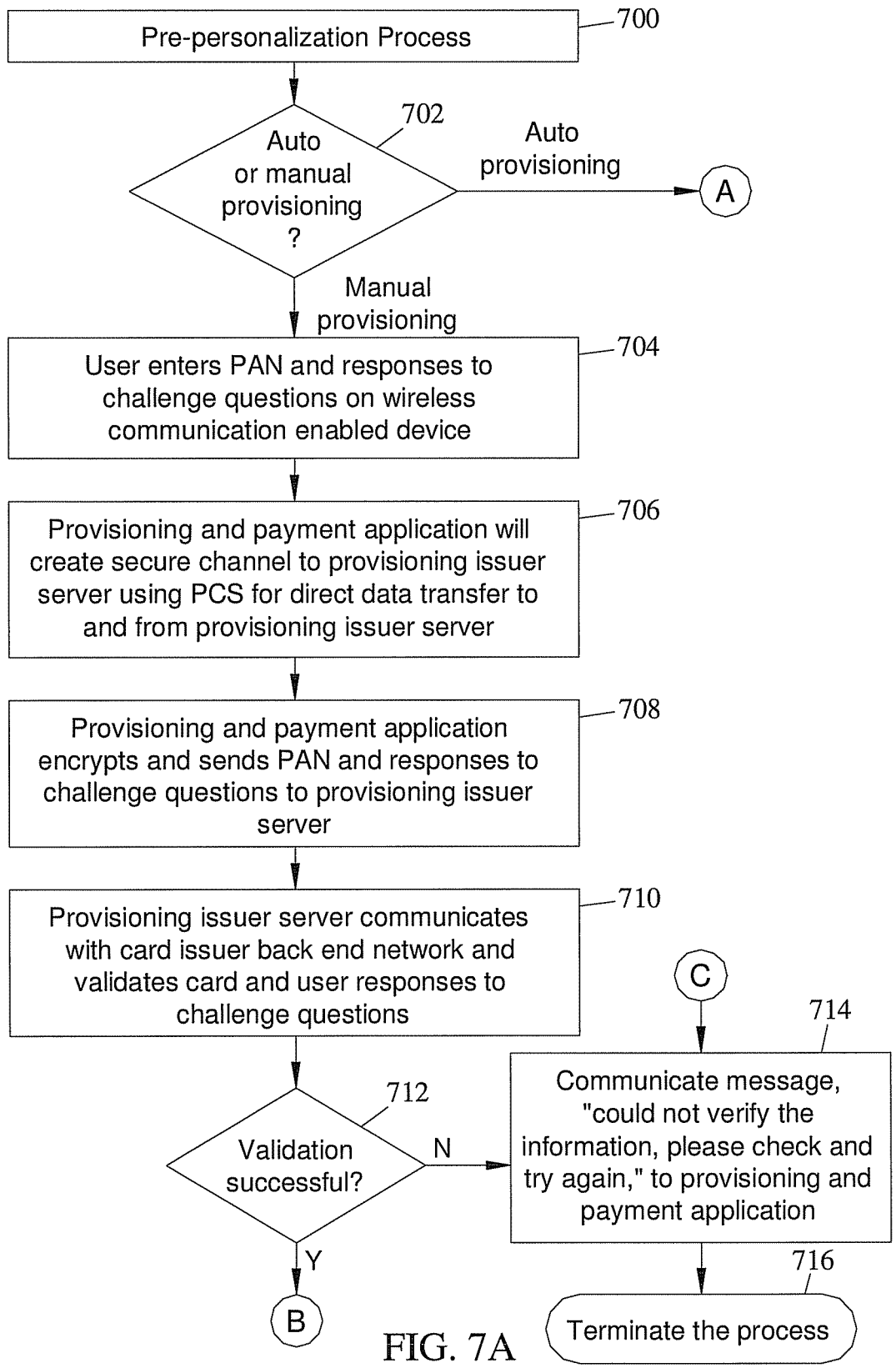
FIGS. 7A and 7B are a flow chart illustrating exemplary detailed steps for the overall provisioning process according to an embodiment of the subject matter described herein.
Figure 7B:
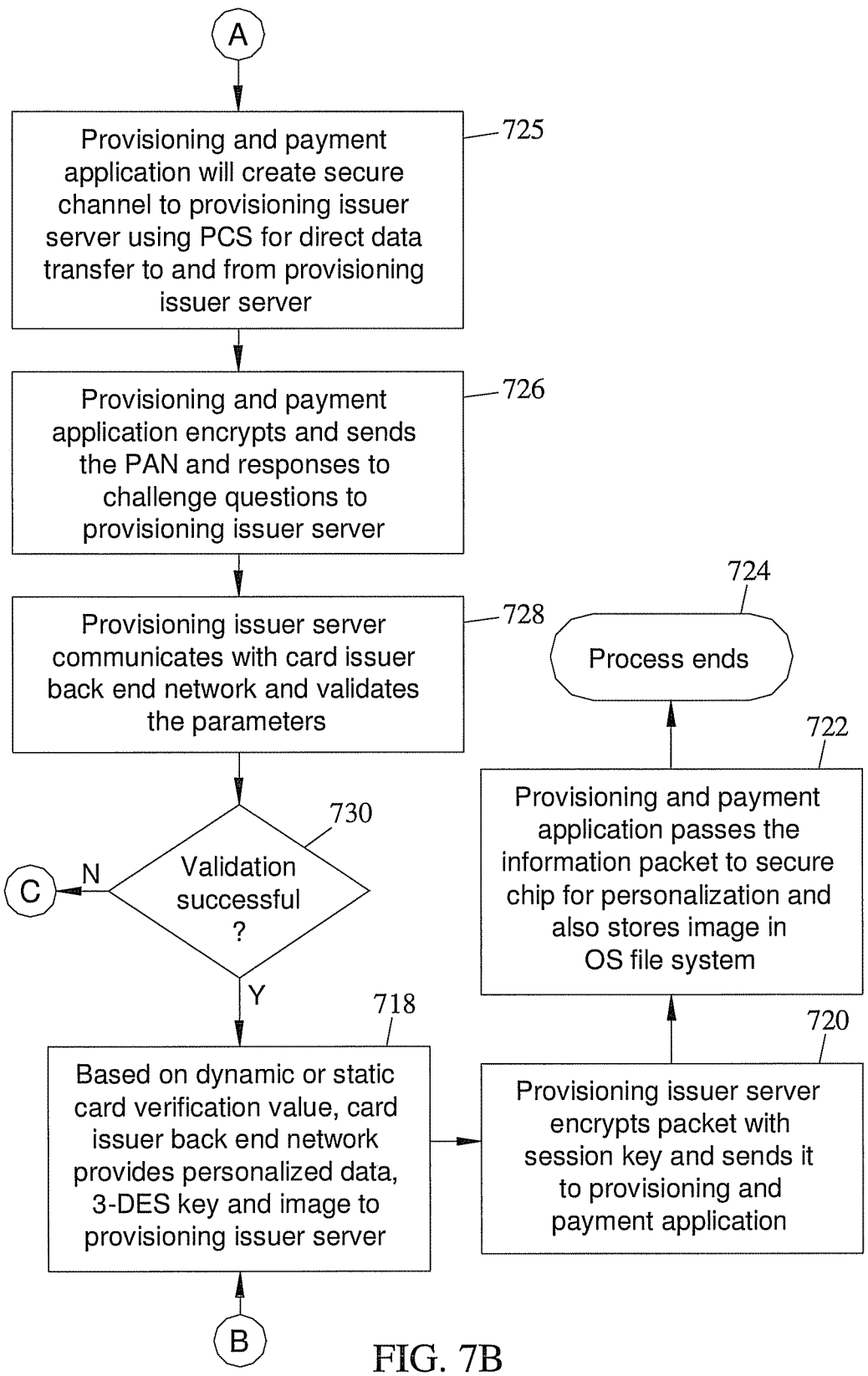

FIGS. 7A and 7B are a flow chart illustrating exemplary detailed steps for both manual and automatic soft card provisioning according to an embodiment of the subject matter described herein. Referring to FIG. 7A, in step 700, provisioning and payment application 102 performs a pre-personalization process. During the pre-personalization process, provisioning and payment application 102 may change or manage an encryption key to be used for establishing secure communications. A pre-personalization process may configure base payments and non-payments applets in the secure chip of the near field communication component through provisioning and payment application 102. Since the functionality of the payment portion is not essential to explaining the subject matter described herein, further description of its operation will not be described.

In step 702, it is determined whether automatic or manual provisioning is being performed. If manual provisioning is being performed, control proceeds to step 704 where the user enters the PAN and responds to the challenge questions on the wireless-communications-enabled device. In step 706, provisioning application 102 on the mobile device (e.g., mobile phone, tablet, personal computer, etc.) creates a secure channel to provisioning issuer server 110 through provisioning configuration server 108 for direct data transfer to and from provisioning issuer server 110. In one embodiment, in step 706, provisioning application 102 on the mobile device (e.g., mobile phone, tablet, personal computer, etc.) creates a secure channel to provisioning issuer server 110 directly for direct data transfer to and from provisioning issuer server 110. In one embodiment, the secure channel established between application 102 and provisioning configuration server 108 enables the associated issuing entity to provide electronic payment or non-payment cards, driving license, passport, national or state identification card, electronic offers, promotions, or coupons to a mobile device belonging to a mobile device user. Accordingly, the established secure channel creates a secured and trusted channel between a service provider and a consumer that enables the mobile device user/customer to recognize that any received cards, information, electronic offers, promotions, and coupons have been sent from a trusted source (i.e., the issuing entity/service provider). Similarly, the established secure channel provides a mechanism to reduce and/or eliminate spam (e.g., unwanted spam advertisements from other third parties) and/or phishing (e.g., attempting to acquire information such as usernames, passwords, and credit card details by masquerading as a trustworthy entity) that is presented to the mobile device user.

In step 708, provisioning and payment application 102 encrypts and sends the PAN identification information and the response to the challenge questions to provisioning issuer server 708. In step 710, provisioning issuer server 110 communicates the PAN and the response to the challenge questions to the card issuer back end network. In step 712, provisioning issuer server 110 determines whether the data has been validated. If the data has not been validated, control proceeds to step 714 where provisioning and payment application 102 indicates that the challenge information entered by the user could not be validated. The user may be prompted to try again. In step 716, the process terminates.

Returning to step 712, if the data is validated, control proceeds to step 718 in FIG. 7B where the card issuer back end network provides card personalization data, an encryption key, and a card image to provisioning an issuer server 110. In step 720, provisioning issuer server 110 encrypts a packet with the session key and sends it to provisioning and payment application 102. In step 722, provisioning and payment application 102 sends the card personalization data to a secure chip present on the mobile trusted handheld device for personalization of the soft card and also stores an image of the soft card in the operating system file system. In step 724, the manual provisioning process ends.

Returning to step 702 in FIG. 7A, if automatic provisioning is selected, control proceeds to step 725 in FIG. 7B where provisioning and payment application 102 creates a secure channel to provisioning issuer server 110 through provisioning configuration server 108 for direct data transfer to and from provisioning issuer server 108. In step 726, provisioning and payment application 102 encrypts and sends the PAN and challenge questions and its response received by web application 104 to provisioning issuer server 110 one at a time. In step 728, provisioning issuer server 110 communicates to the card issuer back end network the responses to the challenge questions for the PAN requested for download. In step 730, it is determined whether the data is validated. If the data is not validated, step 714 and 716 are performed, as described above. If the data is validated, steps 718 through 724 are performed to load the card image and personalization data on the device.

Figure 8A:
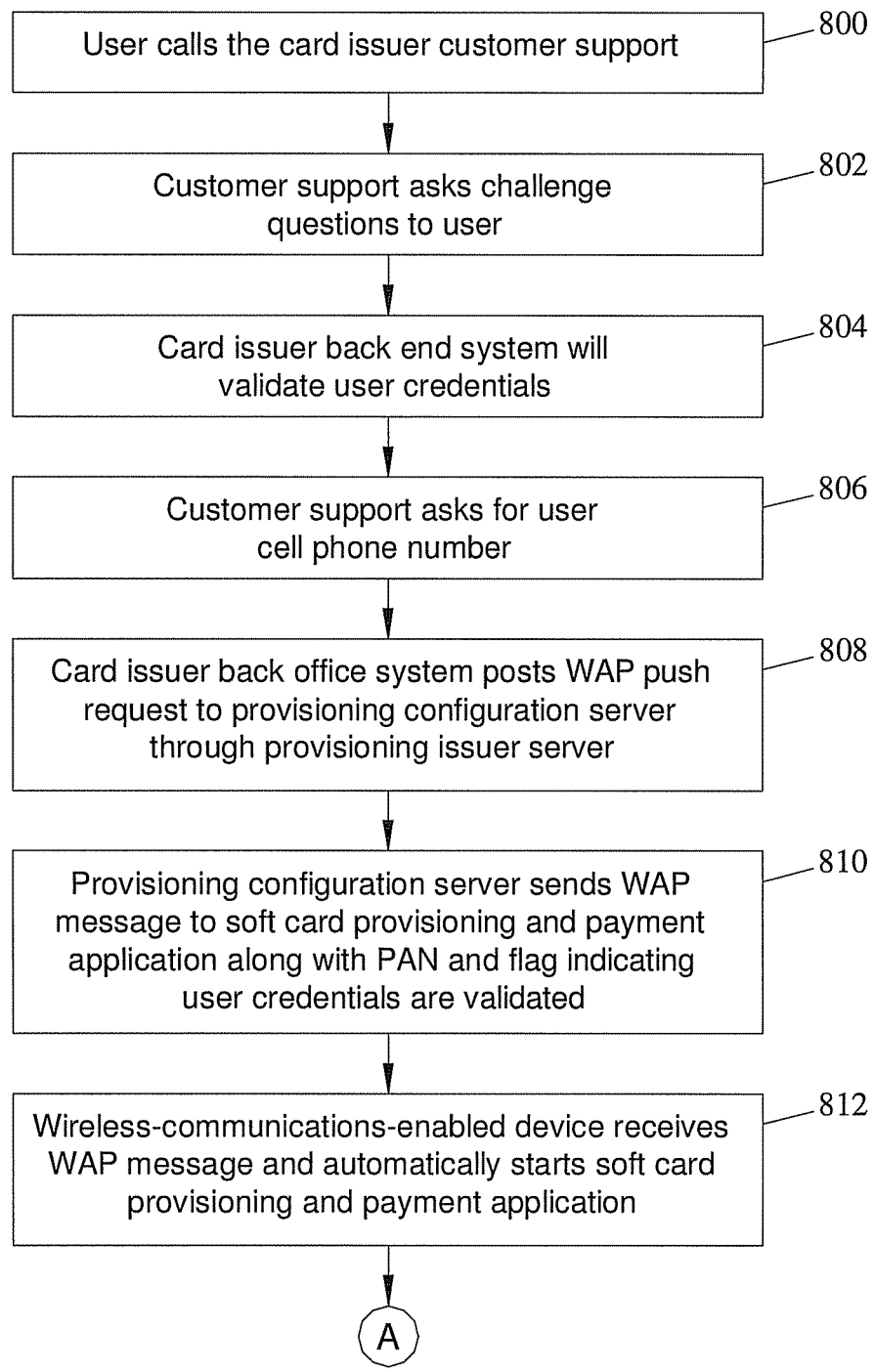
FIGS. 8A and 8B are a flow chart illustrating exemplary steps for provisioning a soft card using WAP push methods according to the embodiment of the subject matter described herein.
Figure 8B:
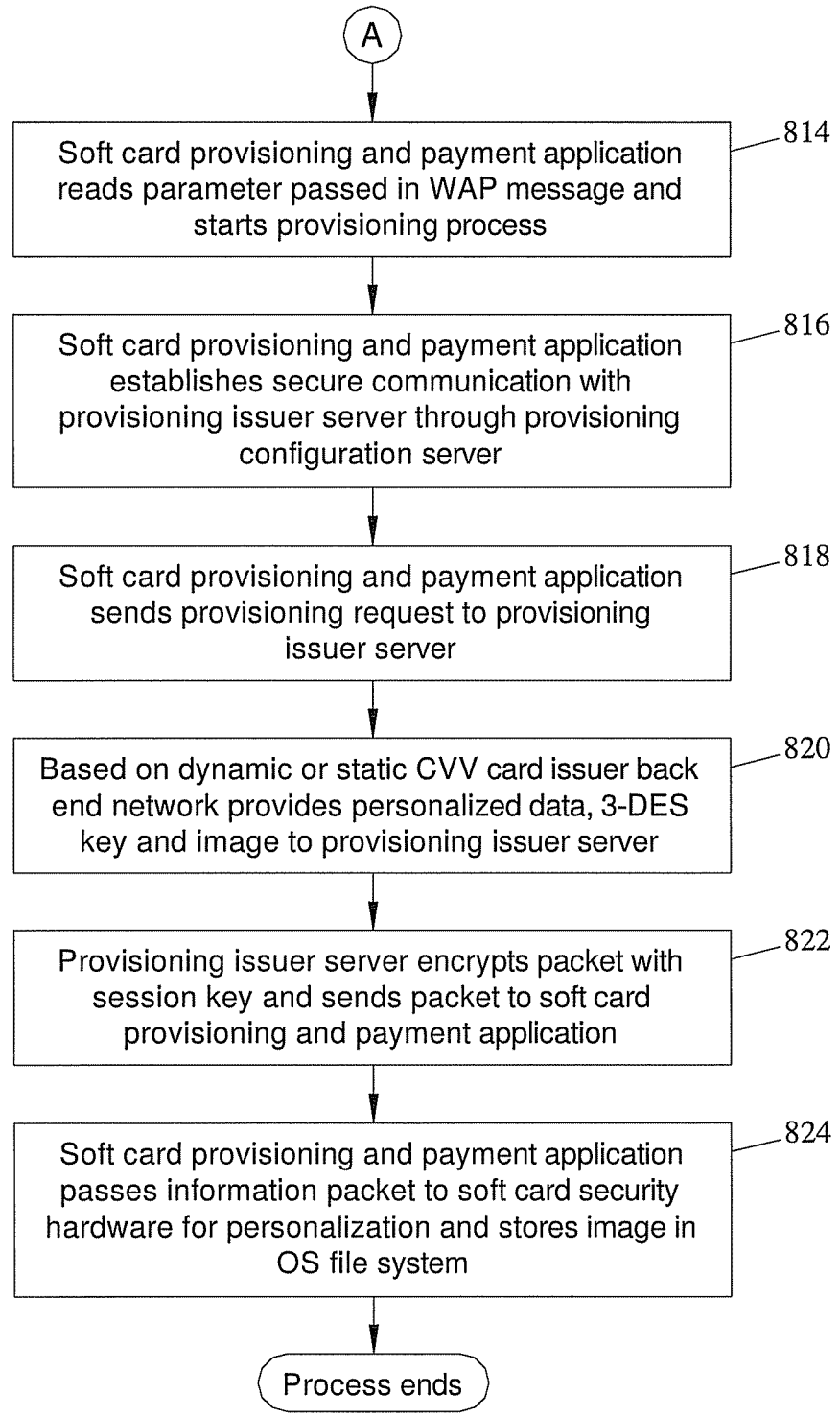

Returning to FIG. 1, another method for provisioning a soft card on a device with wireless communications capabilities is WAP push provisioning. WAP or wireless application protocol is a protocol for delivering information to mobile devices. FIGS. 8A and 8B are a flow chart illustrating exemplary steps for provisioning a soft card using WAP push provisioning or control SMS according to an embodiment of the subject matter described herein. Referring to FIG. 8A, in step 800, a user contacts card issuer customer support via telephone. The user may provide the mobile phone number, PAN number, CW and expiration date embossed on the plastic card for the soft card that the user desires to provision on a mobile device.

In step 802, customer support asks challenge questions to the user. The challenge question may be any card-issuer-specific challenge as described above. In step 804, the card issuer back office application validates the user credentials based on the information provided by the user to customer support.

In step 806, the card issuer back office application posts a WAP push or control SMS request containing provisioning information for the card to provisioning configuration server 108 through provisioning issuer server 110. In step 808, customer support may ask for a cell phone number from user. In step 810, provisioning configuration server 108 sends a WAP message to soft card provisioning and payment application 102 along with a PAN and flag, indicating user credentials are validated, and card issuer information. In step 812, the wireless-communications-enabled device receives the WAP message or control SMS and automatically starts provisioning and payment application 102.

In step 814, soft card provisioning and payment application 102 reads the parameters passed in the WAP message and starts the provisioning process. In step 816, soft card provisioning and payment application 102 establishes secure communications with provisioning issuer server 110 through provisioning configuration server 108. In step 818, soft card provisioning and payment application 102 sends the provisioning request to provisioning issuer server 110.

In step 820, based on a static or dynamic card verification value, the card issuer back end network provides card personalization data, an encryption key, and a card image to provisioning issuer server 110. In step 824, provisioning issuer server 110 encrypts the packet with a session key and sends it to provisioning and payment application 102. In step 826, soft card provisioning and payment application 102 passes the information to secure chip on the device for personalization and stores the card image in the operating system file system.

In one embodiment of, the soft card provisioning application, the provisioning configuration server, and the provisioning issuer server are adapted to provision a soft card (e.g., on a mobile device with wireless communications capabilities) in real time. Similarly, the provisioning configuration server is adapted to identify card issuers for each of a plurality of provisioning requests and effects (e.g., conducts) the provisioning of a respective plurality of soft cards in real time.

It will be understood that various details of the invention may be changed without departing from the scope of the invention. Furthermore, the foregoing description is for the purpose of illustration only, and not for the purpose of limitation.

What is claimed is:

1. A method for over the air (OTA) provisioning a soft card on a device having wireless communications capabilities, the method comprising:
    establishing, by a mobile device with wireless communications capabilities, secure communication between a soft card provisioning application on the mobile device and a provisioning configuration server over an air interface, wherein the secure communication includes a request for provisioning a payment soft card on the mobile device;
    obtaining, by the mobile device, a card number for the payment soft card, the card number including an issuer identifier associated with a provisioning issuer server, wherein the issuer identifier comprises an issuer identifier number (IIN) that is a subset of a number of digits of the card number;
    providing, by the mobile device and to the provisioning configuration server, the IIN included in the card number for the payment soft card;
    obtaining, by the provisioning configuration server, a network address associated with the provisioning issuer server using the IIN, wherein obtaining the network address associated with the provisioning issuer server comprises performing a look up using the IIN in a database located on the provisioning configuration server, and selecting the network address associated with the provisioning issuer server corresponding to the IIN of the card number in the database;
    creating, by the mobile device and using the network address corresponding to the provisioning issuer server, a connection comprising a secure channel between the provisioning issuer server and the mobile device; and
    receiving, by the mobile device, soft card personalization data associated with the payment soft card over the secure channel between the provisioning issuer server and the mobile device.

2. The method of claim 1 wherein the provisioning configuration server includes a secure element trusted service manager (SE-TSM) server and the provisioning issuer server includes a service provider trusted service manager (SP-TSM) server.

3. The method of claim 1 wherein the soft card personalization data includes an instance of the payment soft card.

4. The method of claim 1 wherein the request for provisioning the payment soft card is made by a mobile device user utilizing the mobile device.

5. The method of claim 1 wherein the request for provisioning a payment soft card is made, via an online request, by a mobile device user associated with the mobile device using a web provisioning application.

6. The method of claim 5 wherein the web provisioning application includes an online banking website.

7. The method of claim 1 wherein the network address associated with the provisioning issuer server is used to establish the secure channel directly between the provisioning issuer server and the mobile device.

8. The method of claim 1 wherein receiving data over the secure channel includes receiving via the secure channel at least one of: a payment card, a credit card, a debit card, a prepaid card, an e-purse card, a transit card, a loyalty card, a member card, a state identification card, a healthcare card, a door key card, a non-payment card, a coupon, a promotion, a driving license a national identification card, a passport, a movie ticket, a parking ticket, a transit ticket, and an event ticket.

9. The method of claim 1 comprising receiving, by the soft card provisioning application on the mobile device, card image information associated with the soft card over the secure channel and utilizing the card image information to display a card image of the soft card via a display associated with the mobile device.

10. The method of claim 9 wherein the card image information is stored in an operating system file system of the mobile device, a baseband memory of the mobile device, a secured memory of the mobile device, or a secure element of the mobile device.

11. The method of claim 1 wherein the mobile device includes a mobile telephone, a smartphone, tablet, a portable personal computer (PC), a key fob, a physical card, or a personal digital assistant.

12. The method of claim 1 wherein the soft card personalization data received over the secure channel includes at least one of: a receiving name, an expiration date and card verification value (CW), issuer specific data including customer support number, an issuer uniform resource locator (URL), an issuer name, and network supported information.

13. The method of claim 1 wherein receiving the soft card personalization data over the secure channel includes receiving the soft card personalization data using a transmission control protocol/Internet protocol (TCP/IP), a card application toolkit transport protocol (CAT_TP), or a short message service point to point (SMS PP) over the air interface.

14. The method of claim 1 wherein the mobile device includes memory that comprises at least one of: embedded memory, a universal subscriber identity module (uSIM) part of a universal integrated circuit card (UICC), a subscriber identification module (SIM), a removable element, and device memory.

15. The method of claim 14 wherein the memory comprises a secure element in the mobile device that includes a secure embedded memory, a trust zone area, a subscriber identification module, or an add-on MicroSD device.

16. The method of claim 1 wherein establishing the secure communication includes sending, from the provisioning issuer server to the mobile device, a message; and sending, by the mobile device based on the message, the request for provisioning the payment soft card on the mobile device.

17. A system for over the air (OTA) provisioning of a soft card on a mobile device with wireless communications capabilities, the system comprising:
    a mobile device with wireless communications capabilities, the mobile device comprising a mobile device processor and a memory storing a soft card provisioning application that, when executed by the mobile device processor, causes the mobile device processor to perform an operation of:
    obtaining an issuer identifier associated with a provisioning issuer server from a card number for the payment soft card, the card number including the issuer identifier, wherein the issuer identifier comprises an issuer identifier number (IIN) that is a subset of a number of digits of the card number;

a provisioning configuration server comprising one or more computers, having one or more memories storing provisioning configuration server instructions that, when executed by the one or more computers, cause the one or more computers to perform operations comprising:

establishing secure communication with a soft card provisioning application on the mobile device over an air interface, including receiving a request for provisioning a payment soft card on the mobile device;

receiving, from the mobile device, the IIN; and obtaining a network address associated with the provisioning issuer server using the IIN, wherein obtaining the network address associated with the provisioning server comprises performing a look-up using the IIN in a database located on the provisioning configuration server, and selecting the network address associated with the provisioning issuer server corresponding to the IIN of the card number in the database; and providing the network address associated with the provisioning issuer server to the mobile device;

wherein the soft card provisioning application further causes the mobile device processor to perform operations of creating, using the network address corresponding to the provisioning issuer server, a connection comprising a secure channel between the provisioning issuer server and the mobile device and receiving soft card personalization data associated with the soft card over the secure channel between the provisioning issuer server and the mobile device.

18. The system of claim 17, comprising the provisioning issuer server, wherein the provisioning configuration server includes a secure element trusted service manager (SE-TSM) server and the provisioning issuer server includes a service provider trusted service manager (SP-TSM) server.

19. The system of claim 17, comprising a card issuer back office system comprising the provisioning issuer server.

20. The system of claim 17, comprising a web server executing bank related web provisioning application, that receives provisioning information for a plurality of cards and communicates the information to the provisioning configuration server, wherein the provisioning configuration server identifies card issuers for each of the provisioning requests and conducts provisioning of a plurality of soft cards in the mobile device.

21. The system of claim 17, wherein the soft card provisioning application further causes the mobile device processor to perform an operation of communicating with the provisioning configuration server via a transmission control protocol/Internet protocol (TCP/IP), a card application toolkit transport protocol (CAT_TP), or a short message service point to point (SMS PP) over the air interface.

22. The system of claim 17, comprising the provisioning issuer server, wherein the provisioning issuer server is associated with an issuer of a soft card or application and the provisioning configuration server is associated with an owner or manager of the secure element memory of the mobile device.

23. The system of claim 22 wherein the mobile device comprises a secure element memory that includes at least one of: a secure embedded memory, a trust zone area, a subscriber identification module, or an add-on MicroSD device.

* * * * *